(12) United States Patent
Gould et al.

(10) Patent No.: US 11,537,108 B2
(45) Date of Patent: Dec. 27, 2022

(54) SYSTEMS AND METHODS FOR MOBILE RESOURCE DELIVERY AND MANAGEMENT

(71) Applicant: Clariant International Ltd., Muttenz (CH)

(72) Inventors: Paul Stephen Gould, The Woodlands, TX (US); Douglas Hatton Ford, Charlotte, NC (US); Derek Wayne Blalock, Charlotte, NC (US)

(73) Assignee: CLARIANT INTERNATIONAL LTD., Muttenz (CH)

( * ) Notice: Subject to any disclaimer, the term of this patent is extended or adjusted under 35 U.S.C. 154(b) by 579 days.

(21) Appl. No.: 16/054,163

(22) Filed: Aug. 3, 2018

(65) Prior Publication Data

US 2019/0049927 A1 Feb. 14, 2019

Related U.S. Application Data

(60) Provisional application No. 62/544,381, filed on Aug. 11, 2017.

(51) Int. Cl.
*G05B 19/418* (2006.01)
*E21B 49/08* (2006.01)
(Continued)

(52) U.S. Cl.
CPC ........ *G05B 19/4183* (2013.01); *E21B 49/087* (2013.01); *G05B 19/41875* (2013.01);
(Continued)

(58) Field of Classification Search
CPC .......... G05B 19/4183; G05B 19/41875; E21B 49/087; G06F 9/542; G06Q 10/0832; G06Q 10/0838
(Continued)

(56) References Cited

U.S. PATENT DOCUMENTS 5,014,211 A * 5/1991 Turner .................. D06F 39/022
700/239
2003/0183382 A1* 10/2003 Newman ................. E21B 37/00
166/66

(Continued)

FOREIGN PATENT DOCUMENTS

JP 3685854 B2 * 8/2005
JP 5150236 B2 * 2/2013

OTHER PUBLICATIONS

Merriam-Webster, Definition of PDA, 2021. (Year: 2021).*
(Continued)

*Primary Examiner* — Michael P Nghiem
(74) *Attorney, Agent, or Firm* — McDonnell Boehnen Hulbert & Berghoff LLP

(57) ABSTRACT

The present disclosure relates to methods and systems for oil and gas field production management. An example system includes a production site and a production sensor configured to obtain information about a process parameter associated with the production site. The system also includes an on-site chemical tank and a mobile delivery vehicle with a chemical delivery system. The chemical delivery system is configured to dispense a chemical. The system also includes a controller that carries out operations, which include receiving, from the production sensor, information indicative of a process parameter value associated with the production site and determining, based on the received information, a chemical delivery request. The operations also include, in response to determining the chemical delivery request, routing the mobile delivery vehicle to the production site and causing the chemical delivery system to dispense the chemical to the on-site chemical tank according to the chemical delivery request.

10 Claims, 18 Drawing Sheets

(51) Int. Cl.
*G06F 9/54* (2006.01)
*G06Q 10/08* (2012.01)

(52) U.S. Cl.
CPC ......... *G06F 9/542* (2013.01); *G06Q 10/0832* (2013.01); *G06Q 10/0838* (2013.01)

(58) Field of Classification Search
USPC .......................................................... 702/6
See application file for complete search history.

(56) References Cited

U.S. PATENT DOCUMENTS

| | | | | |
|---|---|---|---|---|
| 2004/0220844 | A1* | 11/2004 | Sanville | G06Q 10/06316 705/7.26 |
| 2006/0156742 | A1* | 7/2006 | Farese | F17C 9/00 62/50.2 |
| 2013/0240080 | A1* | 9/2013 | Pick | F17C 5/007 180/69.5 |
| 2014/0316589 | A1* | 10/2014 | Lichtash | G05B 19/18 700/282 |
| 2020/0057990 | A1* | 2/2020 | Kissel, Jr. | G06Q 10/083 |

OTHER PUBLICATIONS

English translation of Fumoto, Aug. 2005. (Year: 2005).*
English translation of JP 5150236, Feb. 2013. (Year: 2013).*
Veritrax Brochure, Nov. 4, 2016, 6 pages.

* cited by examiner

Figure 14

SYSTEMS AND METHODS FOR MOBILE RESOURCE DELIVERY AND MANAGEMENT

CROSS-REFERENCE TO RELATED APPLICATION

The present application is a non-provisional conversion patent application claiming priority to U.S. Provisional Patent Application No. 62/544,381 filed Aug. 11, 2017, the contents of which are hereby incorporated by reference.

BACKGROUND

Unless otherwise indicated herein, the materials described in this section are not prior art to the claims in this application and are not admitted to be prior art by inclusion in this section.

Mobile resource delivery may include goods or services that may be provided on a continuous or on an as-needed basis. Namely, the resource delivered may include specialty chemicals for the production, completion, and stimulation of various types of sites, such as oil and natural gas wells and their associated pipelines, as well as field processing equipment (e.g., separators, scavenger towers, vessels of various types, heat exchangers, and tanks).

SUMMARY

The present disclosure relates to methods and systems for oil and natural gas well monitoring, analytics, delivery of consumable chemicals, and field service. In some embodiments, systems and methods described herein may reduce or eliminate the need for manual data entry in oilfield chemical delivery services and increase automation, which may significantly reduce operating costs, increase efficiency, and/or improve quality assurance.

In a first aspect, a system is provided. The system includes a positioning system, a chemical delivery site, a chemical delivery system comprising a meter, and a communication interface. The system also includes a controller having at least one processor and a memory. The at least one processor executes program instructions stored in the memory so as to carry out operations. The operations include receiving, from the positioning system, information indicative of the chemical delivery site and causing the chemical delivery system to dispense at least one chemical at the chemical delivery site. The operations additionally include receiving, from the meter, information indicative of a dispensed amount of the at least one chemical and transmitting, to a server via the communication interface, information indicative of the chemical delivery site, the at least one chemical, and the dispensed amount of the at least one chemical.

In a second aspect, a system is provided. The system includes a production site, a production sensor configured to obtain information about a process parameter associated with the production site, an on-site chemical tank, and a mobile delivery vehicle having a chemical delivery system. The chemical delivery system is configured to dispense a chemical. The system also includes a controller having at least one processor and a memory. The at least one processor executes program instructions stored in the memory so as to carry out operations. The operations include receiving, from the production sensor, information indicative of a process parameter value associated with the production site and determining, based on the received information, a chemical delivery request. The operations also include, in response to determining the chemical delivery request, routing the mobile delivery vehicle to the production site and causing the chemical delivery system to dispense the chemical to the on-site chemical tank according to the chemical delivery request.

In a third aspect, a method is provided. The method includes receiving, from at least one production sensor via a communication interface, information indicative of a process parameter value. The at least one production sensor is configured to obtain information about a process parameter associated with a production site. The method also includes determining at a server, based on the received information, a desired chemical and a desired dosage of the desired chemical and causing a chemical delivery system to deliver the desired chemical at the desired dosage to the production site.

In a fourth aspect, a method is provided. The method includes receiving, from at least one sensor via a communication interface, information indicative of a current amount of a chemical in a chemical storage tank. The method also includes determining, based on the received information, a refill condition. The refill condition includes a desired dosage/amount of the chemical. The method additionally includes, in response to determining the refill condition, causing a chemical delivery system to deliver the desired dosage/amount of the chemical to the chemical storage tank.

In a fifth aspect, a method is provided. The method includes receiving, from at least one sensor at a production site, information indicative a desired dosage/amount of a chemical. The method also includes, based on the received information, causing a chemical delivery system to deliver the desired dosage/amount of the chemical to an on-site chemical tank at the production site.

In a sixth aspect, a method is provided. The method includes obtaining a test sample from a production site and associating the test sample with a unique test sample identifier. The method also includes analyzing the test sample, determining, based on analyzing the test sample, at least one process parameter value, and, based on the determined at least one process parameter value, carrying out at least one of: generating a test report based at least on: the unique test sample identifier and the determined at least one process parameter value, generating a notification based at least on: the determined at least one process parameter value and a location of the production site, or updating at least one database based at least on: the unique test sample identifier and the determined at least one process parameter value.

In a seventh aspect, a method is provided. The method includes receiving, from a production sensor at a production site, information indicative of at least one process parameter value associated with the production site. The method also includes, based on the received information, providing, via a display of a mobile computing device, at least one of: a spreadsheet, a report, or historical production data. The method yet further includes, based on the received information, providing a notification. The notification includes at least one of: an audio alert, a voicemail, an email, or a text message.

In an eighth aspect, a system is provided. The system includes a positioning system, a delivery site, a delivery system having a sensor, a communication interface, and a controller having at least one processor and a memory, wherein the at least one processor executes program instructions stored in the memory so as to carry out operations. The operations include receiving, from the positioning system, information indicative of the delivery site and causing the delivery system to deposit at least one package at the delivery site. The operations also include receiving, from the sensor, information indicative of a deposit of the at least one package and transmitting, to a server via the communication interface, information indicative of the delivery site, the at least one package, and the deposit of the at least one package.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 14 illustrates a user interface, according to an example embodiment.

DETAILED DESCRIPTION

Figure 1A:
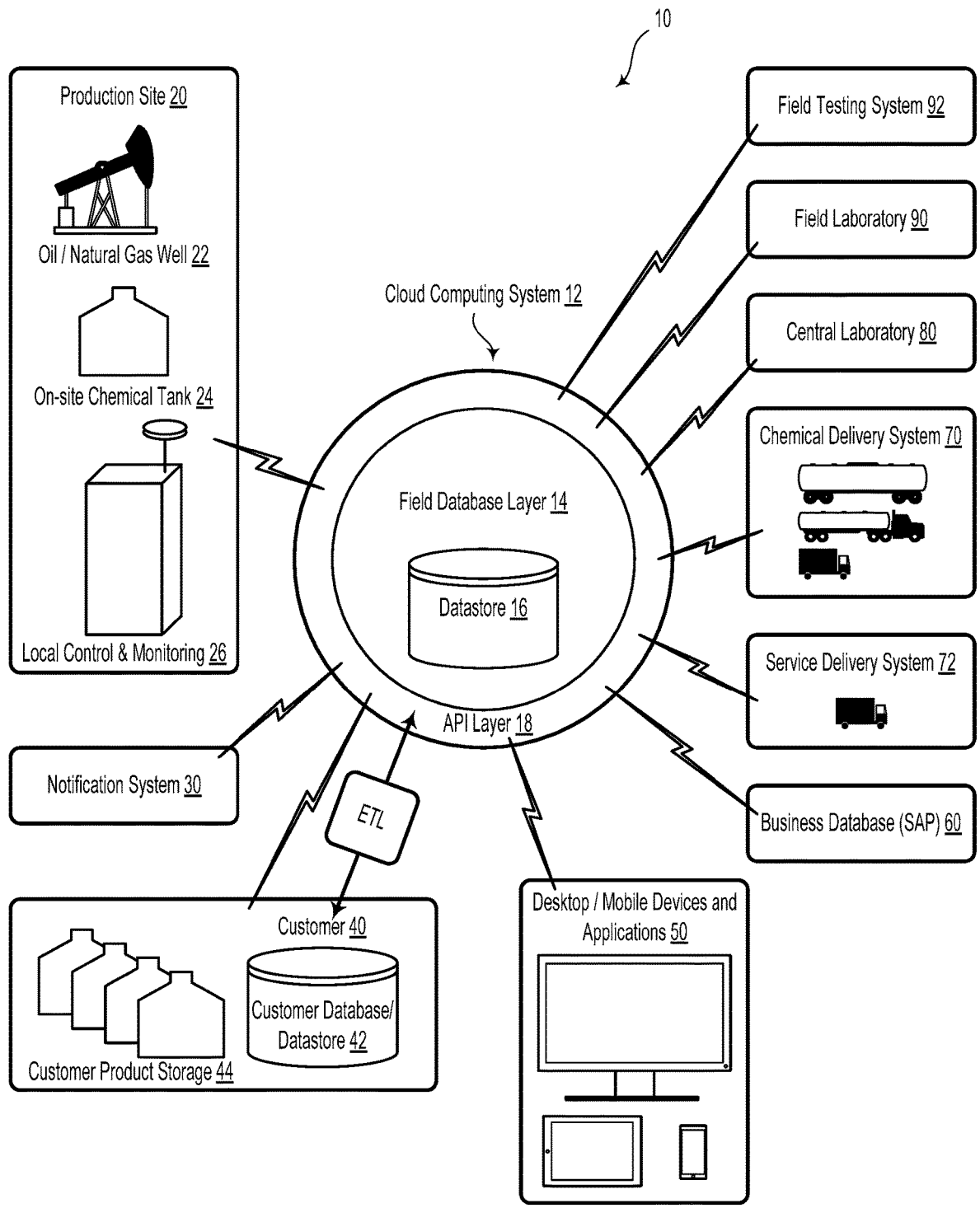
FIG. 1A illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

In some embodiments, chemical delivery management in the industry of oil and gas production may be improved by utilizing automation and remote sensing systems. Namely, example systems and methods may include a plurality of remote sensors distributed among a plurality of oil/gas well sites. The remote sensors may be configured to monitor chemical levels, flow rates, among other process parameters. For example, the remote sensors may include analog or digital liquid level sensors, pressure sensors, process flow sensors, temperature sensors, volume sensors, proximity sensors and/or cameras.

The remote sensors may be communicatively coupled to a server, which could include a cloud-based computing system. The server may be configured to automatically monitor the plurality of remote sensors at all times or at periodic intervals of time.

Additionally or alternatively, the server may be operable to maintain historical records of process parameter values. In some embodiments, the server may be configured to analyze historical trends so as to, for example, forecast, predict, or otherwise anticipate a future process parameter value and/or future oil/gas well output or condition.

In some embodiments, the server may be configured to provide notifications and/or alerts to supervisory personnel based on information provided by the remote sensors. For example, the server may provide a notification or an alert in response to an oil or gas flow rate being below or above a predetermined threshold. Such notifications or alerts may be transmitted to oil/gas well supervisors, chemical delivery personnel, emergency personnel (e.g., fire department, hazardous material abatement personnel, other individuals, or other computing systems.

In example embodiments, the server may be operable to notify a mobile delivery vehicle and/or its driver to provide a chemical to a given oil/gas well site. In such a scenario, the server may provide a location of the oil/gas well site and a routing system may route the delivery vehicle to the well site. In some embodiments, the server may dynamically route the mobile delivery vehicle based on real-time process parameters received from the plurality of oil/gas well sites. That is, the server may assign new chemical delivery jobs, service visits, or other types of tasks. Such dynamic routing may reduce "windshield time", or the unproductive time spent traveling to and from remote sites.

Upon reaching the well site, a chemical delivery system of the mobile delivery vehicle may be operable to deliver a desired amount of a given chemical, optionally at a desired flow rate. The mobile chemical delivery vehicle may upload a dispensing report to the server, which may include a location of the chemical delivery, an amount of a given chemical, a mixture or proportion amount (e.g., in the case of multiple additives, etc.), among other information.

In some example embodiments, a mobile computing device may provide information to service personnel. For example, a mobile computing device may display a desired chemical, a desired amount, an estimated time of arrival, and a dynamic delivery status (e.g., not yet delivered, currently filling delivery, delivered, etc.).

In various embodiments, the mobile computing device and/or the server may be operable to generate orders and/or invoices based on, among several possibilities, remote sensor data, filled chemical deliveries, delivered chemical volumes, and/or oil/gas well health status.

In some embodiments, the systems and methods described herein may provide more efficient analytical field and/or laboratory oil/gas well testing. Namely, a field or laboratory technician may label or otherwise designate a given oil/gas well test sample. The label may include, for example, information indicative of a well location from which the test sample was taken. In such scenarios, the test samples may be monitored in real time throughout the analysis process.

In example embodiments, the server and/or various mobile computing devices may request and/or provide reports. The reports may include information about one or more process parameters and/or may include information about an overall health (e.g., key performance indicator (KPI) reports) of one or more oil/gas wells or subsystems of such wells.

Systems and methods described herein may provide several benefits. For example, disclosed systems and methods may provide higher oil or gas production performance by reducing well failures, increasing production volumes by as much as 15% or more. Presently described systems and methods may also provide reduced costs and improved efficiency due to automated processes and round-the-clock oil/gas well monitoring. Furthermore, in some embodiments, described systems and methods may reduce risk and improve safety by reducing driving hours, vehicle operating costs, and environmental footprint.

II. Example Systems

FIG. 1A illustrates a system 10, according to an example embodiment. System 10 includes a cloud computing system 12, a production site 20, a notification system 30, a customer 40, desktop and mobile devices and applications 50, a business database 60, a chemical delivery system 70, a central laboratory 80, a field laboratory 90, and a field testing system 92.

The cloud computing system 12 may include a field database layer 14, an associated datastore 16, and an application programming interface 18. In example embodiments, the cloud computing system 12 may include one or more computer servers, which may be located remotely with respect to one or more other elements of system 10. The datastore 16 may include a standard query language (SQL) relational database management system or another type of database management system. In an example embodiment, datastore 16 may be an SAP HANA relational database management system.

The application programming interface 18 may provide interoperability between the cloud computing system 12 and other elements of system 10 by way of various protocols, such as representational state transfer (REST) web services and/or simple object access protocol (SOAP). Other protocols that provide interoperability between different computing systems and devices are contemplated herein.

The application programming interface 18 may additionally or alternatively utilize various file formats and languages, such as JavaScript Object Notation (JSON) and/or extensible markup language (XML). It will be understood that a variety of other file formats and languages are contemplated so as to provide interoperability between the cloud computing system 12 and other elements of system 10.

The production site 20 may include, but need not be limited to an oil/natural gas well 22. Other examples of production sites may include a surface or sub-surface mine, an offshore well, or an oil production plant. Additionally or alternatively, the production site 20 could include field processing equipment (e.g., separators, scavenger towers, vessels of various types, heat exchangers, and tanks). It will be understood that production site 20 may relate to many different examples of production facilities, and all such examples are contemplated within the scope of the present disclosure.

The cloud computing system 12 may include one or more business process servers. Such business process servers may be configured to monitor data in the cloud computing system 12 and/or the datastore 16. The business process servers could monitor data trends, compare current process data to historical trends or normal operating ranges.

Furthermore, the business process servers could be configured to take various actions. For example, the business process servers may schedule periodic actions (e.g., scheduled chemical refill deliveries, scheduled preventative maintenance visits, etc.) or schedule actions based on, for example, process data being outside a normal operating range. In an example embodiment, the business process servers could initiate a chemical delivery or maintenance visit based on a production metric (e.g., average barrels of oil per day) being outside a normal range. Other types of actions initiated or carried out by the business process servers based on data values or trends are possible and contemplated herein.

In some embodiments, the business process servers and/or other portions of the cloud computing system 12 could be operable to provide an automated calendaring feature, which may provide administrators the ability to monitor various actions (e.g., future scheduled actions, in-process actions, and/or historical actions). As an example, the automated calendaring feature could provide a user interface that may display a comprehensive overview of such actions. In an example embodiment, the automated calendaring feature could handle future scheduling of periodic or as-needed chemical delivery or field service actions. Furthermore, the automated calendaring feature may provide the capability to adjust individual future or in-process actions. Such adjustments could include chemical dose volumes, scheduled delivery date/time, production site location, etc. Furthermore, such adjustments could be based on, for example, real-time process parameter information, financial information, or other types of information.

In an example embodiment, the cloud computing system 12 and/or the business process servers could be operable to request electronic funds transfers that correspond to invoices generated upon completion of the various actions described herein. For example, upon completion of a service delivery or chemical delivery, the cloud computing system 12 and/or the business process servers could automatically request an electronic funds transfer based on the services rendered or chemical amount delivered.

The production site 20 may additionally include on-site chemical storage, such as on-site chemical tank 24. The on-site chemical tank 24 may be configured to contain one or more chemicals that may be used in conjunction with other elements of production site 20, such as the oil/natural gas well 22. For example, the one or more chemicals may include, but need not be limited to: antifoamers, asphaltene inhibitors, biocides, clarifying agents, corrosion inhibitors, demulsifiers, foamers, hydrate inhibitors, paraffin inhibitors, pipeline chemicals, scale inhibitors, scavengers (e.g., $H_2S$ & $O_2$), multipurpose surfactants, lubricants, proppants, or other types of chemicals.

The production site 20 may also include various means for local control and monitoring 26. In an example embodiment, the local control and monitoring 26 may include one or more sensors, which may provide information indicative of a remaining amount of the one or more chemicals in the on-site chemical tank 24 (e.g., a level or load sensor) and/or a dose rate of the one or more chemicals from the on-site chemical tank 24 (e.g., a flow rate or pump rate sensor).

Local control and monitoring 26 may also include one or more dosing pumps, which may be operable to dispense the one or more chemicals from the on-site chemical tank 24 according to a desired dose flow rate and/or a desired dose volume.

Furthermore, local control and monitoring 26 may include a communication interface that may provide a communication link between the production site 20 and the cloud computing system 12 and/or other elements of system 10. As an example, the communication interface may include wired and/or wireless communication links.

The notification system 30 may be configured to provide a notification message based on a past, present, or anticipated condition. In some embodiments, the notification system 30 may be incorporated, in full or in part, with the cloud computing system 12 and/or another computing device or a software application (e.g., desktop/mobile devices and applications 50). The notification message may be in the form of an email, a text message, a request, a command, a voice mail, a visual or audio notification, a report, or another type of information transfer. The notification message may include, for example, information about the specific condition and, optionally, information about automated actions performed (or scheduled to be performed) in response to the specific condition. The notification message may take other forms as well.

In response to determining a relevant past, present, or anticipated condition, one or more notification messages may be delivered from the notification system 30 to one or more other elements of system 10. For example, in response to a low chemical level indication (e.g., provided from local control and monitoring 26), the notification system 30 may send a low chemical level notification and a related chemical refill invoice to the customer 40, a report to the cloud computing system 12, a chemical delivery request to chemical delivery system 70, and an alert notification via the desktop or mobile devices and applications 50.

The customer 40 may include an owner or lessee of the production site 20 or another third-party. The customer 40 may have its own customer database/datastore 42. In some embodiments, the cloud computing system 12 may include functionality to extract, transform, and/or load (ETL) information from the customer database/datastore 42. Furthermore, some embodiments include ETL functionality or other types of data transfer from the cloud computing system 12 to the customer database/datastore 42. In other words, cloud computing system 12 and the customer database/datastore 42 may provide uni-directional and/or bi-directional means for: 1) data extraction of homogeneous or heterogeneous data sources; 2) data transformation for storage in a desired format or structure for ease of analysis and data query; and 3) data loading for entry into a target database or data warehouse.

It will be understood that the data utilized by the cloud computing system 12 and the customer database/datastore 42 may be stored, transmitted, and otherwise utilized in many different source formats including, but not limited to: relational databases, XML and flat files, non-relational databases, or other data structures such as virtual storage access methods (VSAM) or indexed sequential access methods (ISAM).

Furthermore, the customer 40 may include a customer product storage 44. The customer product storage 44 may include a storage facility, which may include tanks for storage of oil, natural gas, or other types of products (or byproducts) obtained from production site 20.

Desktop and mobile devices and applications 50 may include one or more desktop computers, laptop computers, tablets, smartphones, wearable computing devices, head-mountable displays (HMDs), and/or other types of mobile computing devices. Such computing devices may include a display, a user interface for data entry, and a positioning system. The display may be operable to provide graphical and/or text information to a user of the computing device. The computing devices may include one or more input means, which could include, but need not be limited to: a keyboard, a touch screen, a touch pad, a microphone (e.g., for speech input), and/or a camera. The computing devices may additionally include one or more output means, such as the aforementioned display, a speaker, a haptic feedback device, and/or another type of device configured to provide feedback to a user of the computing device. The user interface may operable to interact with any of the contemplated input and output means. The positioning system may include a global positioning system (GPS) or another type of device configured to provide information indicative of a position of the respective computing device.

In the cases where the computing devices include a camera, the computing devices may be operable to create native photographic and/or video records corresponding to one or more field actions (e.g., chemical or service deliveries, pump service, sample collection, etc.). Such records may be automatically uploaded to the cloud computing system 12 and may be associated with a relevant action, customer, production site, etc. In some embodiments, the photographic and/or video records could include a location stamp and time stamp, as well as comments, descriptions, and/or other relevant metadata.

In some embodiments, the computing devices may include one or more sensors. For example, the one or more sensors could include a thermometer, a pressure sensor, and/or a chemical analysis sensor. Additionally or alternatively, the one or more sensors could be part of a mobile analysis kit. A user may obtain a sample (e.g., from the production site 20) and conduct an analysis using the mobile analysis kit. Upon analysis, the mobile analysis kit may interact with the computing device so as to provide information to the user about the sample (e.g., information indicative of chemical composition, pH, biological activity, scale, corrosion, viscosity, etc.). Furthermore, the information about the sample could be provided to the cloud computing system 12 and/or other elements of system 10.

Desktop and mobile devices and applications 50 may also include one or more software application configured for execution by the computing devices described herein. The applications may include various functionalities. For example, the applications may include one or more rate/flow/dose calculators. Additionally or alternatively, the applications may include knowledge management, training, customer feedback, human resources, and/or audio/visual presentation software. In some embodiments, the applications may include a mobile turn-key warehouse application, which may, among other possible functions, be configured to provide real-time information about warehouse inventory, invoicing, chemical pricing, and planning (scheduled warehouse replenishments and chemical deliveries, etc.).

In an example embodiment, the applications may include a customer dashboard or another type of customer relationship management (CRM) software. The customer dashboard may include information about the past, present, and/or anticipated health and production of the production site 20 (e.g., running average barrels of oil per day) and about the past, present, and/or anticipated chemical use or chemical needs of the production site 20. The customer dashboard may also include historical information about invoices relating to chemical deliveries and/or a summary of various financial metrics (e.g., capital expenses for a given production site and/or return on investment for a given production site over a given period of time, etc.).

In some embodiments, the applications may include an integrated mobile supply chain management application and planning tool. Such an application may be configured to provide information about status of a chemical order, wait times, estimated delivery date/times, and/or inventories.

The business database 60 may be configured to run business management software, which may include a variety of different modules. Each module may perform one or more different functions. For example, the business database 60 may include an SAP relational database with a plurality of modules. The modules may be configured to interact with information stored in the business database 60, and may include, for example, customer relationship management (CRM), financials, sales, purchasing, invoicing, banking, inventory, production, project management, service, planning, and/or human resources. Other types of modules may be associated with the business database 60.

The chemical delivery system 70 may include various means for chemical delivery, which may range in size and scope from a "box truck" or "pickup truck" delivery vehicle, a "treater truck", a tank refill truck, a semi-truck delivery vehicle, or a railcar delivery vehicle. In alternative examples, the chemical delivery system 70 may include unmanned vehicles such as unmanned aerial vehicles, self-driving trucks, or other autonomous vehicles. In some embodiments, the chemical delivery system 70 may be configured to provide various chemical volumes, which may range from less than a gallon to thousands of gallons or more of a given chemical. Other types of chemical delivery systems are possible. For example, while liquid chemicals are described herein, it will be understood that delivery of solid and/or gaseous chemicals is both possible and contemplated herein.

In an example embodiment, the chemical delivery system 70 may be configured to deliver one or more chemicals to a given production site 20. Furthermore, in some embodiments, the chemical delivery system 70 may include a metering system configured to measure a chemical flow rate and/or an amount of chemical delivered to the given production site 20. As an example, the metering system may provide precise flow measurements when dispensing chemicals at the production site 20. In an example embodiment, flow rates could be monitored and adjusted to within ±0.1 gallons or smaller volume increments.

In some embodiments, the metering system may be operable to communicate with one or more mobile computing devices (e.g., a smartphone or desktop/mobile devices and applications 50) and an associated application (e.g., a mobile delivery application) to obtain a desired chemical dose volume. In such scenarios, a dispensing controller of the metering system may be able to perform the task of providing the desired chemical dose volume to the production site 20. Furthermore, upon completion of the task, the dispensing controller and/or the metering system could provide a completion report to the mobile computing device, which may be uploaded to the cloud computing system 12. It will be understood that the metering system could communicate with, or be controlled by, the cloud computing system 12 in other ways, each of which is contemplated herein.

In an example embodiment, the chemical delivery system 70 may include a positioning system, such as a global positioning system (GPS) or another type of system configured to provide information indicative of a location of the chemical delivery system 70.

The chemical delivery system 70 may additionally include at least a portion of a routing system. The routing system may be configured to provide a delivery driver with a dynamic, real-time delivery manifest and/or delivery route. The dynamic delivery manifest and/or delivery route may be provided to a delivery driver based on real-time information received from the cloud computing system 12. That is, the cloud computing system 12 may provide real-time chemical delivery instructions based on, for example, information from the production site 20, the notification system 30, the customer 40, or other elements of system 10.

The chemical delivery instructions could include, for example, information about a chemical name, a mixture, a type of chemical, a desired delivery volume. In example embodiments, the dynamic delivery manifest may be archived, printed, or otherwise saved. As an example, the dynamic delivery manifest may be printed so as to comply with various local, state, and federal regulations. Furthermore, the dynamic delivery manifest may include material safety datasheet (MSDS) information regarding the chemicals to be delivered, including that of hazardous materials.

As an additional example, in some scenarios, hazardous chemicals may be collected from production site 20. Such chemicals may include, for instance, waste byproducts of the production process. In such scenarios, a dynamic manifest or inventory could be automatically updated and maintained with the appropriate MSDS information for the hazardous chemicals collected from the production site 20. As such, chemical delivery system 70 could automatically update and maintain a real-time inventory for each chemical on a given chemical delivery vehicle. In such cases, the real-time inventory could include descriptions of each chemical on board the vehicle, as well as their respective volumes/weights and safety information (e.g., MSDS).

In some embodiments, the dynamic delivery route may provide the delivery driver with an efficient driving route to one or more production sites 20 based on, for example, the time of day, the physical location of the production sites 20, an importance level of a notification from the notification system 30, an amount of remaining chemical aboard the chemical delivery system 70, an anticipated travel duration (e.g., drive time), an anticipated delivery duration (e.g., an estimated amount of time to complete a chemical delivery task once a delivery vehicle is on-site), etc.

In some embodiments, the system 10 may include a service delivery system 72. In such scenarios, the service delivery system 72 may provide delivery of various services to the production site 20 in a similar fashion as that of chemical delivery system 70. The services provided by the service delivery system 72 may include a variety of remote and on-site repair, maintenance, upgrade, retrofit, construction, or demolition services. By way of example, the service delivery system 72 could include chemical dosing pump repair and/or field device calibration, among other possibilities.

The service delivery system 72 may optionally include mobile vehicles (e.g., service trucks, automated robots, or drone vehicles) that could be similar or identical to that of the chemical delivery system 70. Furthermore, the functions of chemical delivery and service delivery could be combined into a single mobile vehicle and human personnel. For example, an on-site chemical delivery visit may be combined with a service visit so as to improve efficiency by reducing redundant travel time and its associated costs. It will be understood that the service delivery system 72 may interact with other elements of system 10 in a similar or identical manner as that of the chemical delivery system 70. Yet further, all references made herein to chemical deliveries should be understood to include and incorporate similar implementations of service deliveries using service delivery system 72.

The central laboratory 80 may include a dedicated laboratory, which may be utilized for chemical analysis of various samples obtained from the oil/natural gas well 22, the on-site chemical tank 24, or the customer product storage 44, among other possibilities. The central laboratory 80 may be operable to investigate various process parameters described elsewhere herein. For example, the central laboratory 80 may obtain information about the samples using equipment such as gas chromatography (GC) and/or time-of-flight mass spectrometry (TOFMS) systems. It will be understood that other analytical tools may be utilized at the central laboratory 80 and all such possibilities are contemplated herein.

The central laboratory 80 may provide information to the cloud computing system 12. For example, in some embodiments, the information may include test sample results, reports, photos, videos, or other information about the samples.

In some embodiments, the field laboratory 90 may include a dedicated facility for field testing that is physically located proximate to the production site 20. The field laboratory 90 could include a dedicated building or analysis equipment, among other examples. In contrast, the field testing system 92 may include, among other possibilities, portable test kits or other types of mobile diagnostic or analytic systems configured to provide information indicative of various aspects of the production site 20, such as the oil/natural gas well 22 and/or the on-site chemical tank 24.

The field laboratory 90 and the field testing system 92 may include various analytical tests that may be performed by, for example, a delivery driver to obtain further information about the production site 20 (e.g., information indicative of the health of the oil/natural gas wells 22). Various tests that could be performed in association with the field laboratory 90 and the field testing system 92 may include a corrosion test, a pH test, a biological material test, a scaling test, or other types of tests.

The field laboratory 90 and field testing system 92 may provide test sample results, reports, audio, photos, videos, field test comments, and/or other information about the samples to the cloud computing system 12. In some embodiments, the field laboratory 90 and/or the field testing system 92 may be operable to automatically request a chemical refill/reorder and/or a service visit based on the field test results or other observations.

Figure 1B:
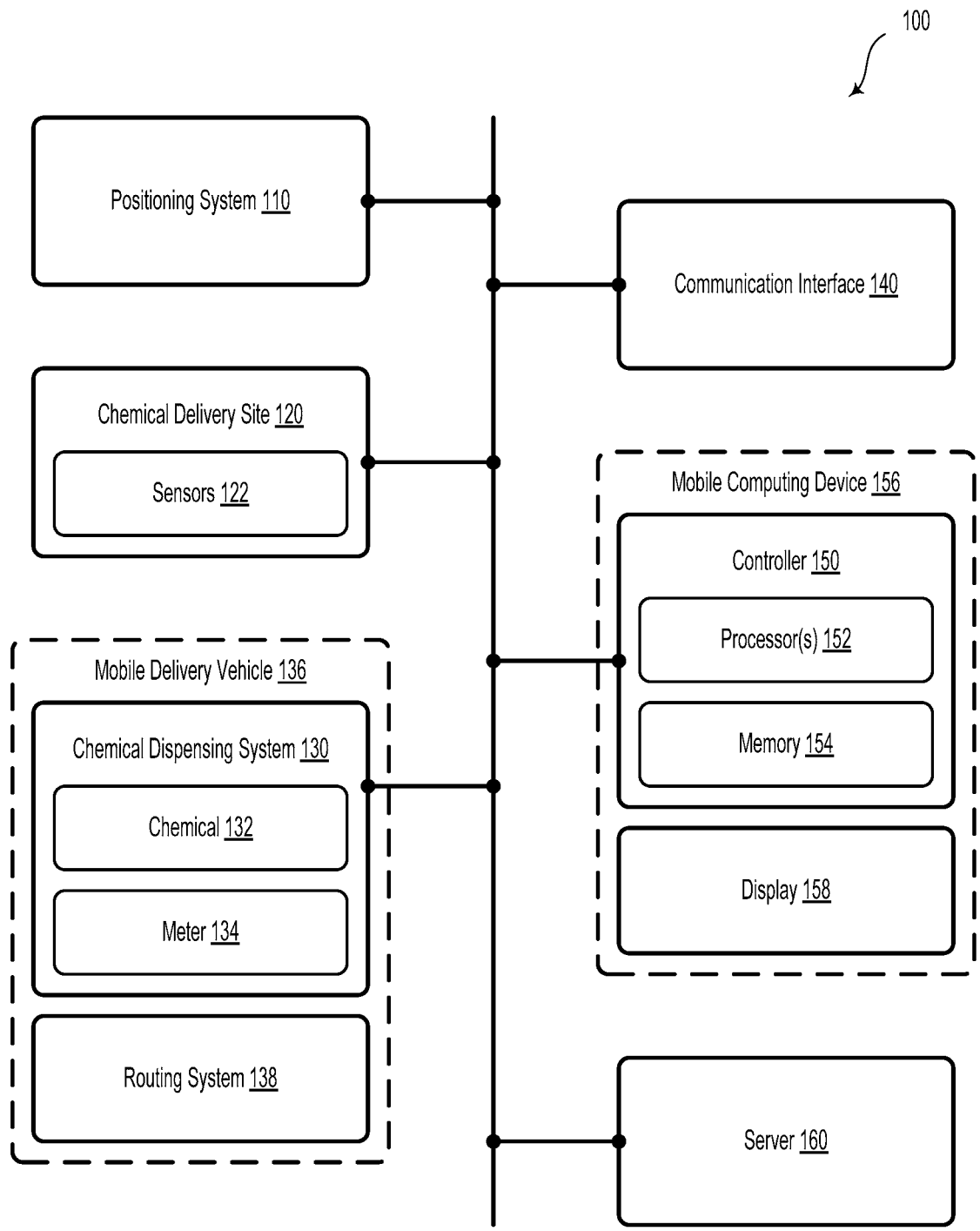
FIG. 1B illustrates a system, according to an example embodiment.

FIG. 1B illustrates a system 100, according to an example embodiment. System 100 may be similar or identical to system 10, as illustrated and described in reference to FIG. 1A. As illustrated in FIG. 1B, system 100 includes a positioning system 110, a chemical delivery site 120, a chemical delivery system 130, a communication interface 140, a controller 150, and a server 160.

In some embodiments, the chemical delivery system 130 may be coupled to a mobile platform, such as mobile delivery vehicle 136. Furthermore, in example embodiments, at least some of the functionality of controller 150 may be carried out by a mobile computing device 156, which may additionally include a display 158.

The positioning system 110 may include a global positioning system (GPS), an inertial measurement unit (IMU), a gyroscope, and/or another type of device configured to provide information indicative of a location of the mobile delivery vehicle 136. Additionally or alternatively, the positioning system 110 may provide information indicative of a location of one or more of the plurality of sensors 122 and/or the chemical delivery site 120. The GPS may be any sensor (e.g., location sensor) configured to estimate a geographic location of a physical object (e.g., the mobile delivery vehicle 136, a sensor 122, or the chemical delivery site 120). To this end, the GPS may include a transceiver configured to estimate a location of the positioning system 110 with respect to the Earth. The GPS may take other forms as well. The IMU may include a combination of sensors configured to sense position and orientation changes of the positioning system 110 based on inertial acceleration. In some embodiments, the positioning system 110 may include a combination of sensors such as accelerometers and gyroscopes. Other combinations of sensors are possible as well.

Chemical 132 may include specialty chemicals used in the oil/gas well industry. For example, chemical 132 may include one or more well service additives, such as anti-sludging additives, biocides, corrosion inhibitors, foamers, scale inhibitors, viscosifiers/gellants, or preflush/surfactant additives. Additionally or alternatively, chemical 132 could include, but need not be not limited to defoamers, cement dispersants, fluid loss additives, scale inhibitors, and/or multipurpose surfactants/detergents. Specialty chemicals may be used to reduce or eliminate erosion/pitting corrosion or stress corrosion cracking and detect bacterial contamination, corrosive contaminants such as hydrogen sulfide ($H_2S$) and iron sulfide (FeS), and oxygen contamination. It will be understood that chemical 132 may include other deliverable resources or consumable materials that may need replenishment at periodic intervals or on an as-needed basis.

The mobile delivery vehicle 136 additionally includes a routing system 138. The routing system 138 may include various navigation and pathing capabilities, which may determine, at least in part, a driving path for the mobile delivery vehicle 136. The routing system 138 may additionally be configured to update the driving path dynamically while the mobile delivery vehicle 136 is in operation. In some embodiments, the routing system 138 may be configured to incorporate data from a sensor fusion algorithm, the GPS, and one or more maps so as to determine the driving path for the mobile delivery vehicle 136.

System 100 includes a communication interface 140. The communication interface 140 may be configured to provide communication between the various elements of system 100, such as the controller 150, the positioning system 110, one or more computing networks, and/or other mobile delivery vehicles.

The communication interface 140 could be, for example, a system configured to provide wired or wireless communication between one or more elements of system 100 or external systems. To this end, the communication interface 140 may include an antenna and a chipset for communicating with the one or more elements of system 100 or external systems. The chipset of communication interface 140 in general may be arranged to communicate according to one or more types of wireless communication (e.g., protocols) such as BLUETOOTH, BLUETOOTH LOW ENERGY (BLE), communication protocols described in IEEE 802.11 (including any IEEE 802.11 revisions), cellular technology (such as GSM, CDMA, UMTS, EV-DO, WiMAX, or LTE), ZIGBEE, dedicated short range communications (DSRC), and radio frequency identification (RFID) communications, among other possibilities.

In some embodiments, the communication interface 140 may include a satellite communication interface.

In an example embodiment, the communication interface 140 could additionally or alternatively include a low-power wide-area network (LPWAN) or a low-power network (LPN). Such low-power networks may provide long range communication between various elements of systems 10 and/or 100 at lower power and, generally, a lower data rate as compared to conventional wide area networks (WAN). As an example, the LPWAN could include a wireless sensor network that may include any of the sensors described herein. It will be understood that LPWAN communication interfaces may include a wide variety of different protocols, arrangements, and configurations, all of which are contemplated in the present disclosure. The communication interface 140 may take other forms as well.

System 100 also includes a controller 150. The controller 150 includes one or more processors 152 and a memory 154. The controller 150 could be located, at least in part, onboard the mobile delivery vehicle 136. Additionally or alternatively, at least a portion of the controller 150 may be located at the server 160. As such, some portions of the controller 150 may be disposed on the mobile delivery vehicle 136 while other portions of the controller 150 are disposed elsewhere.

The controller 150 may include an on-board computer, an external computer, or a mobile computing platform, such as a smartphone, tablet device, personal computer, wearable device, etc. Additionally or alternatively, the controller 150 may include, or be connected to, a remotely-located computer system, such as a cloud server. That is, in some embodiments, at least a portion of the functionality of controller 150 may be carried out by a cloud computing system such as cloud computing system 12, as illustrated and described in relation to FIG. 1A. In an example embodiment, the controller 150 may be configured to carry out some or all method blocks or steps described herein.

The processor 152 may include, for instance, an application-specific integrated circuit (ASIC) or a field-programmable gate array (FPGA). Other types of processors, computers, or devices configured to carry out software instructions are contemplated herein. The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

In some embodiments, the server 160 may be similar or identical to the cloud computing system 12. However, server 160 could additionally or alternatively include other types of computing devices.

In an example embodiment, the operations that may be carried out by controller 150 could include receiving, from the positioning system 110, information indicative of the chemical delivery site 120. For example, the positioning system 110 could provide a location (e.g., GPS coordinates and/or routing information) of the chemical delivery site 120. Additionally or alternatively, the positioning system 110 may directly or indirectly provide such information to the routing system 138.

The operations include causing the chemical delivery system 130 to dispense at least one chemical 132 at the chemical delivery site 120. In some embodiments, the amount and/or rate of delivery of the chemical 132 may be monitored and/or controlled by meter 134.

In example embodiments, the operations include receiving, from the meter 134, information indicative of a dispensed amount of the at least one chemical 132. As an example, the meter 134 may provide information indicative of a volume, a flow rate, and/or a tank level to the controller 150.

In some embodiments, the operations include transmitting, to the server 160 via the communication interface 140, information indicative of the chemical delivery site 120, the at least one chemical 132 (e.g., a name of the chemical or another identifier for the chemical composition), and the dispensed amount of the at least one chemical 132 (e.g., an amount in volume, weight, proportion, or another relevant unit of measure).

As described herein, the chemical delivery site 120 may include at least one of: an oil well, a natural gas well, an oil stripper well, or a natural gas stripper well. Other types of production sites are possible, including mining, geothermal, solar, or other facilities.

In scenarios involving the mobile delivery vehicle 136, the chemical delivery system 130 and the meter 134 may be coupled to, or housed on or in, the mobile delivery vehicle 136. In such situations, the mobile delivery vehicle 136 may include a tanker truck, a delivery truck, an aerial delivery vehicle (e.g., an tanker aircraft), or a water-borne delivery vehicle (e.g., a tanker ship). In some embodiments, the mobile delivery vehicle 136 may include a human delivery driver or pilot. In other embodiments, the mobile delivery vehicle 136 may include a self-driving vehicle, an aerial drone aircraft, or a water-borne drone ship. Other types of delivery vehicles are possible and contemplated.

In scenarios involving the mobile computing device 156, at least a portion of the controller 150 may be coupled to, and/or housed within, the mobile computing device 156. The mobile computing device 156 may include: a tablet computer, a smartphone, a laptop computer, or a cloud computing network.

Figure 1C:
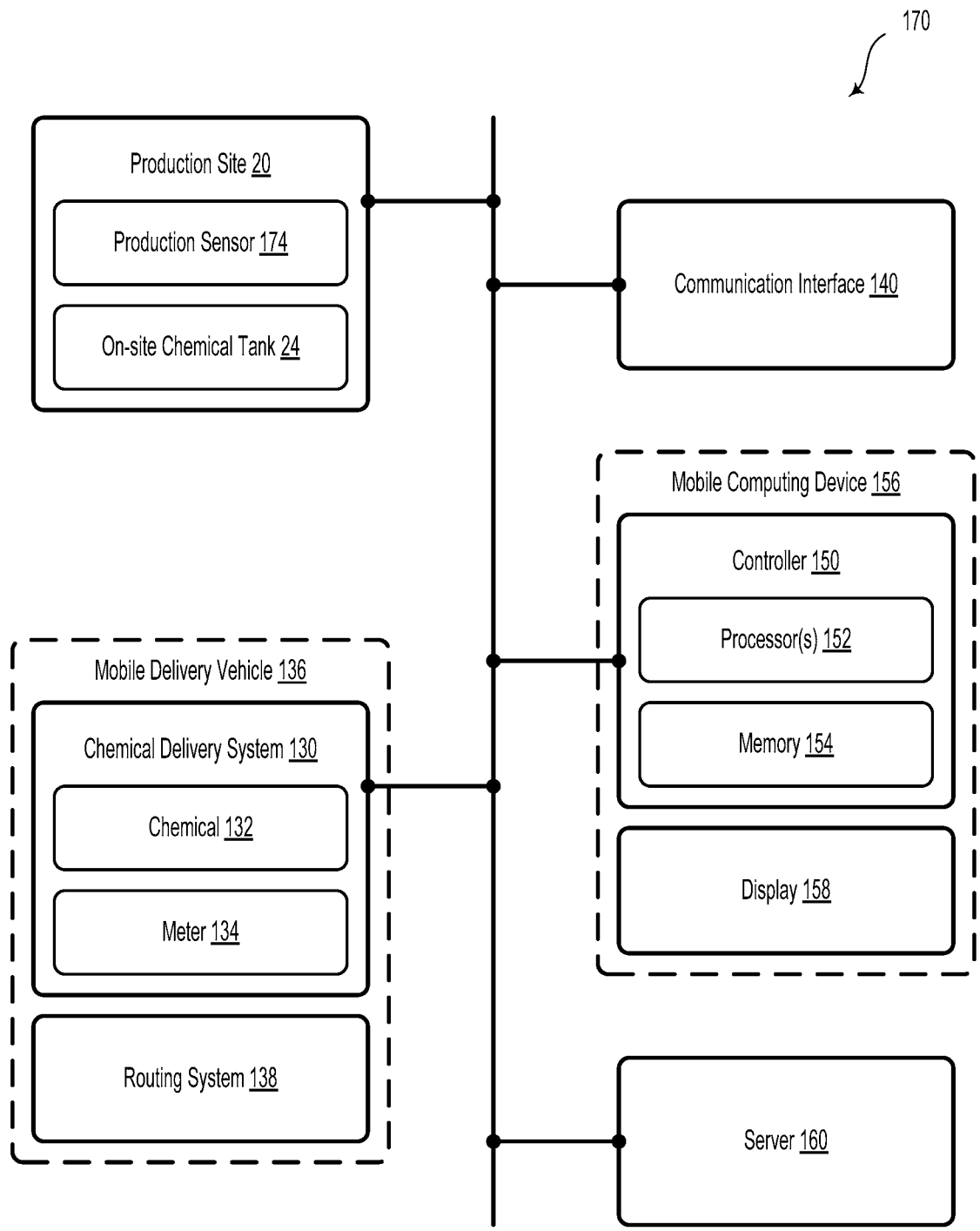
FIG. 1C illustrates a system, according to an example embodiment.

FIG. 1C illustrates a system 170, according to an example embodiment. The system 170 may be similar or identical to systems 10 and 100, as illustrated and described in reference to FIGS. 1A and 1B.

In an example embodiment, the system 170 may include a production site 20 and a production sensor 174 configured to obtain information about a process parameter associated with the production site 20. The production site 20 also includes an on-site chemical tank 24.

In such a scenario, the controller 150 may be configured to carry out operations, which may include receiving, from the production sensor 174, information indicative of a process parameter value associated with the production site 20. In such a scenario, the operations may include determining, based on the received information, a chemical delivery request. Process parameter values could include, but are not limited to, a pressure (e.g., a well head pressure), a temperature (e.g., a temperature of a production component and/or a temperature of a chemical in a chemical storage tank), a voltage (e.g., a production sensor output voltage), or a volume (e.g., a remaining volume in a chemical storage tank). It will be understood that the process parameter values could include any other information about a production site and/or its operation that could be beneficial in determining whether a new chemical delivery request to that production site is warranted.

In some example embodiments, a cloud computing system (e.g., cloud computing system 12) could determine whether a new chemical delivery request is necessary and/or needed. For example, the cloud computing system 12 could determine the new chemical delivery request based on the information received from the production sensor 174 along with historical information associated with a given production site, current or future chemical inventory information, and/or business process logic (e.g., just-in-time delivery rules, supply/demand information, pricing information, delivery contract information, etc.).

In response to determining the chemical delivery request, the operations may include routing the mobile delivery vehicle 136 to the production site 20 and causing the chemical delivery system 130 to dispense the chemical 132 to the on-site chemical tank 24 according to the chemical delivery request.

As described elsewhere herein, the system 170 may include a mobile computing device 156. The mobile computing device 156 may include at least one of: a tablet computer, a smartphone, a laptop computer, or a cloud computing network.

Additionally or alternatively, the operations may include receiving, from the production sensor 174, information indicative of a timestamp. In such scenarios, determining the chemical delivery request may be based, at least in part, on the timestamp.

In some embodiments, the operations could include receiving, from the production sensor 174, information indicative of a production site identifier (e.g., a production site name, code, and/or GPS location of production site). In such examples, determining the chemical delivery request may be alternatively or additionally based on the production site identifier.

Furthermore, the operations may include receiving information indicative of a current chemical level (or other indicia of remaining chemical) in the on-site chemical tank 24. In such scenarios, determining the chemical delivery request may be based, at least in part, on the current level of the on-site chemical tank 24.

In some embodiments, the operations may further include receiving, from at least one of: the field testing system 92, the field laboratory 90, or the central laboratory 80, information indicative of a sample test result. In such scenarios, determining the chemical delivery request may be based, at least in part, on the sample test result.

In example embodiments, the operations also include, in response to determining the chemical delivery request, generating an invoice based on the chemical delivery request. Furthermore, in such cases, the operations may include automatically transmitting the generated invoice to at least one of: the customer database/datastore 42 or the business database 60.

In some embodiments, the operations additionally include, in response to determining the chemical delivery request, updating at least one database based on: a production site identifier (e.g., a GPS location of the production site 20), the process parameter value (e.g., rolling average barrels of oil per day), and a timestamp (e.g., date/time).

Figure 1D:
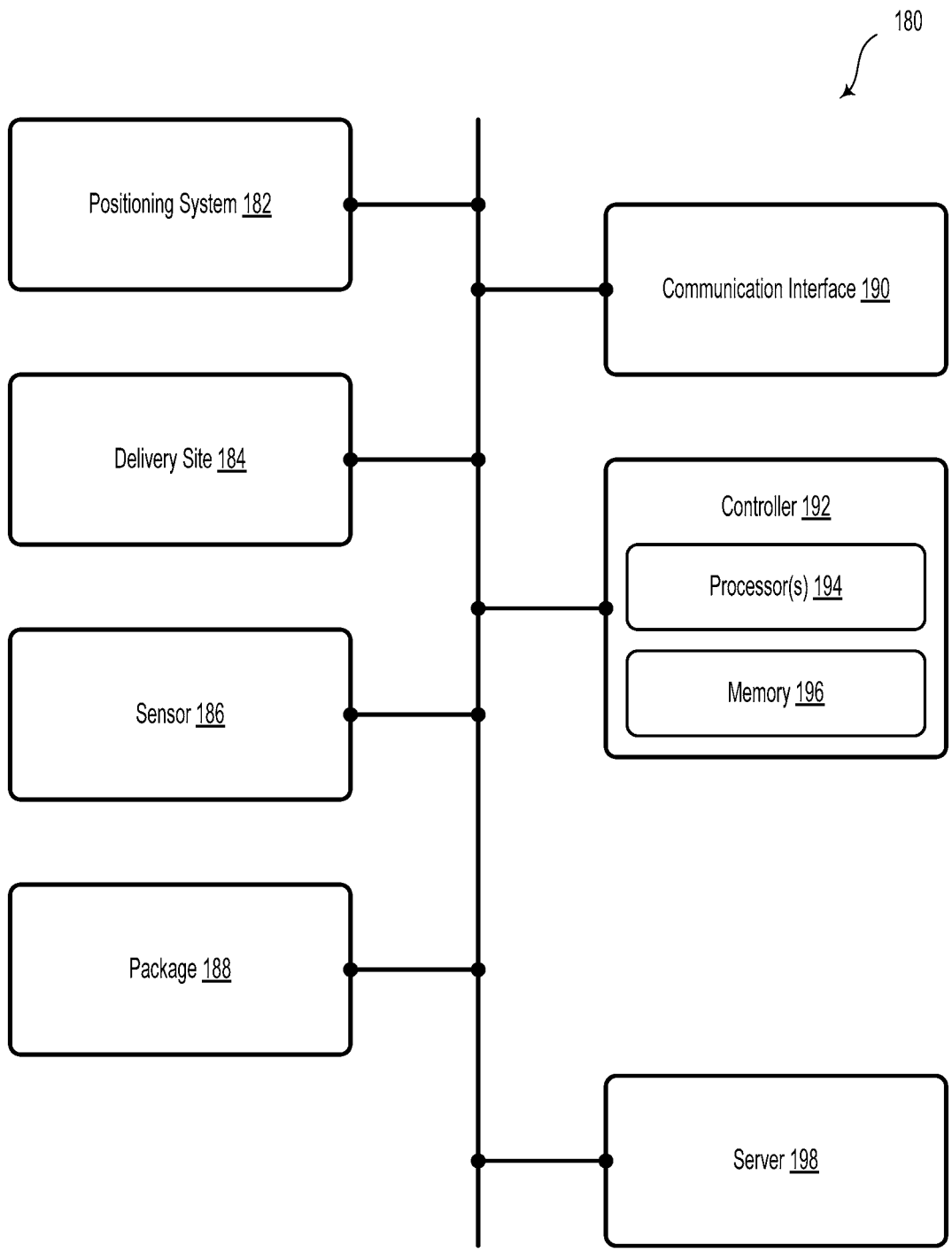
FIG. 1D illustrates a system, according to an example embodiment.

FIG. 1D illustrates a system 180, according to an example embodiment. System 180 may be operable to perform mobile package delivery. The system 180 could include some elements that could be similar or identical to those illustrated and described in systems 10, 100, and 170 in relation to FIGS. 1A, 1B, and 1C. For example, system 180 includes a positioning system 182, which may be similar or identical to positioning system 110. The system 180 also includes a delivery site 184, which may include, without limitation, the chemical delivery site 120 or the production site 20. Delivery site 184 could additionally or alternatively residential, commercial, or other types of locations. The system 180 also includes a sensor 186, which may be configured to determine whether a package (e.g., package 188) has been delivered to the delivery site 184 by the system 180.

The system 180 also includes a communication interface 190, which could be similar or identical to communication interface 140. The system 180 additionally includes a controller 192 having at least one processor 194 and a memory 196. In some embodiments, the controller could be similar or identical to controller 150. The controller 192 could be operable to carry out operations, such as receiving, from the positioning system 182, information indicative of the delivery site 184. The operations also include causing the system 180 to deposit at least one package 188 at the delivery site 184. The operations further include receiving, from the sensor 186, information indicative of a deposit of the at least one package 188. The operations include transmitting, to a server 198 via the communication interface 190, information indicative of the delivery site 184, the at least one package 188, and the deposit of the at least one package 188.

In some embodiments, server 198 may be similar or identical to cloud computing system 12. It will be recognized that one or more functions of cloud computing system 12 could be applied to the delivery of packages using system 180, as described herein. For example, a package delivery request could be initiated based on a notification received or generated by cloud computing system 12. Furthermore, in response to receiving a delivery confirmation, the cloud computing system 12 could be configured to automatically generate a corresponding invoice and/or request a corresponding electronic funds transfer.

Without limitation, package 188 could include one or more liquid, solid, or gaseous chemicals, including chemical 132, as described herein. Additionally or alternatively, package 188 could include other types of consumable goods, replacement parts, upgrade parts, new equipment, computer hardware, computer software, or other material goods.

III. Example Methods

Figure 2:
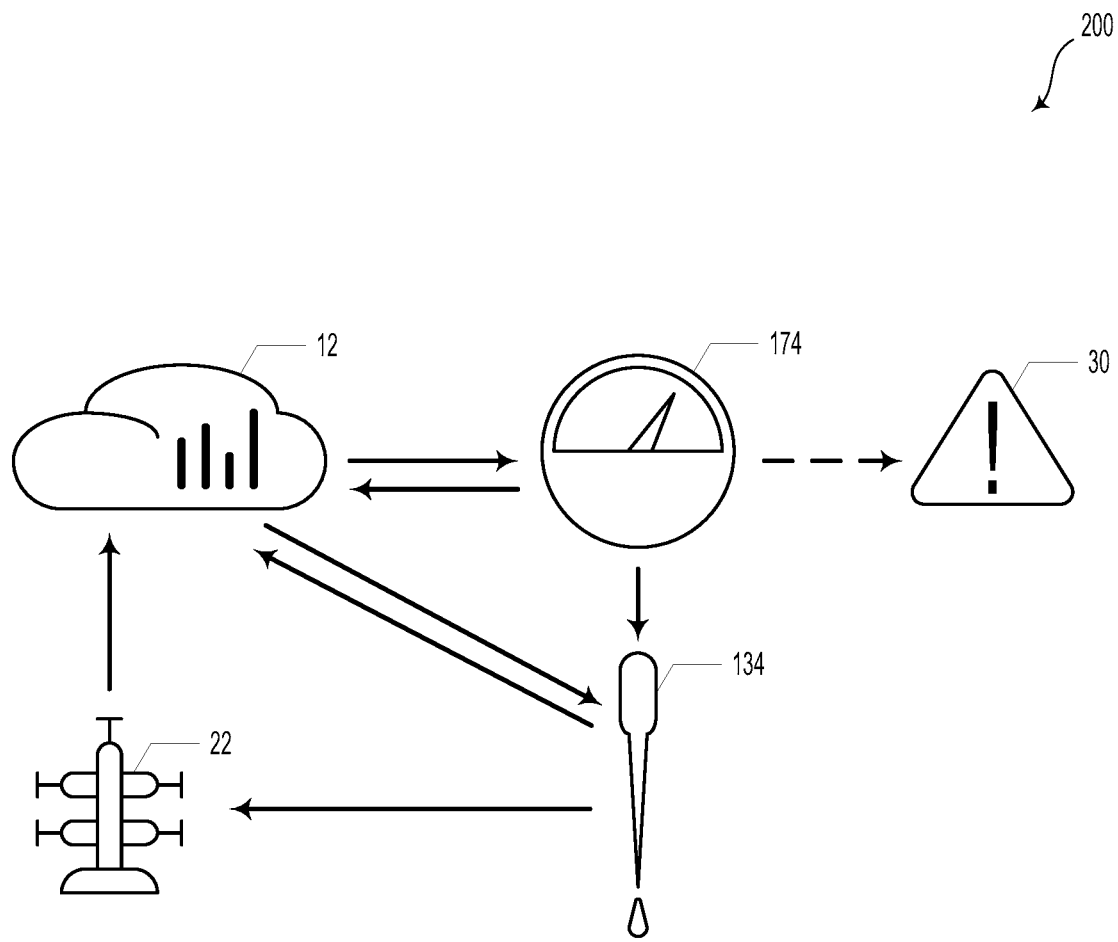
FIG. 2 illustrates a method, according to an example embodiment.

FIG. 2 illustrates a method 200, according to an example embodiment. Method 200 may be carried out, in full or in part, by some or all elements of systems 10, 100, and 170 as illustrated and described in reference to FIGS. 1A, 1B, and 1C. As such, method 200 may include elements that are similar or identical to those illustrated and described with reference to FIGS. 1A, 1B, and 1C. It will be understood that the method 200 may include fewer or more steps or blocks than those expressly disclosed herein. Furthermore, respective steps or blocks of method 200 may be performed in any order and each step or block may be performed one or more times. In some embodiments, method 200 may be combined with one or more other methods illustrated and described herein.

Method 200 may include receiving, from at least one production sensor (e.g., production sensor 174) via a communication interface (e.g., communication interface 140), information indicative of a process parameter value. The at least one production sensor is configured to obtain information about a process parameter associated with a production site 20 and/or oil/natural gas well 22.

Examples of process parameters may include, without limitation, an average flow rate of a product (e.g., oil, natural gas, or another type of product), a pressure, a chemical composition of a well, an average amount of production (e.g., average barrels of oil per day), production site status (e.g., information indicative of an oil well operating within a normal range), production site health (e.g., information indicative of an oil well operating age, pump cycles, etc.), or other information that may be desired to provide real-time data about the production site 20.

Method 200 includes determining at a server, based on the received information, a desired chemical (e.g., chemical 132) and a desired dosage of the desired chemical.

Method 200 additionally includes causing a chemical delivery system (e.g., chemical delivery system 130) to deliver the desired chemical at the desired dosage (e.g., using the meter 134) to the production site 20.

In some embodiments, the method 200 may additionally or alternatively include determining, based on the received information and prior process parameter values, historical production data.

In further embodiments, the method 200 may also include determining (using the notification system 30), based on the received information, an alarm condition. In such scenarios, the method 200 may also include, in response to determining the alarm condition, transmitting an alert notification (e.g., from the notification system 30) via the communication interface.

Figure 3:
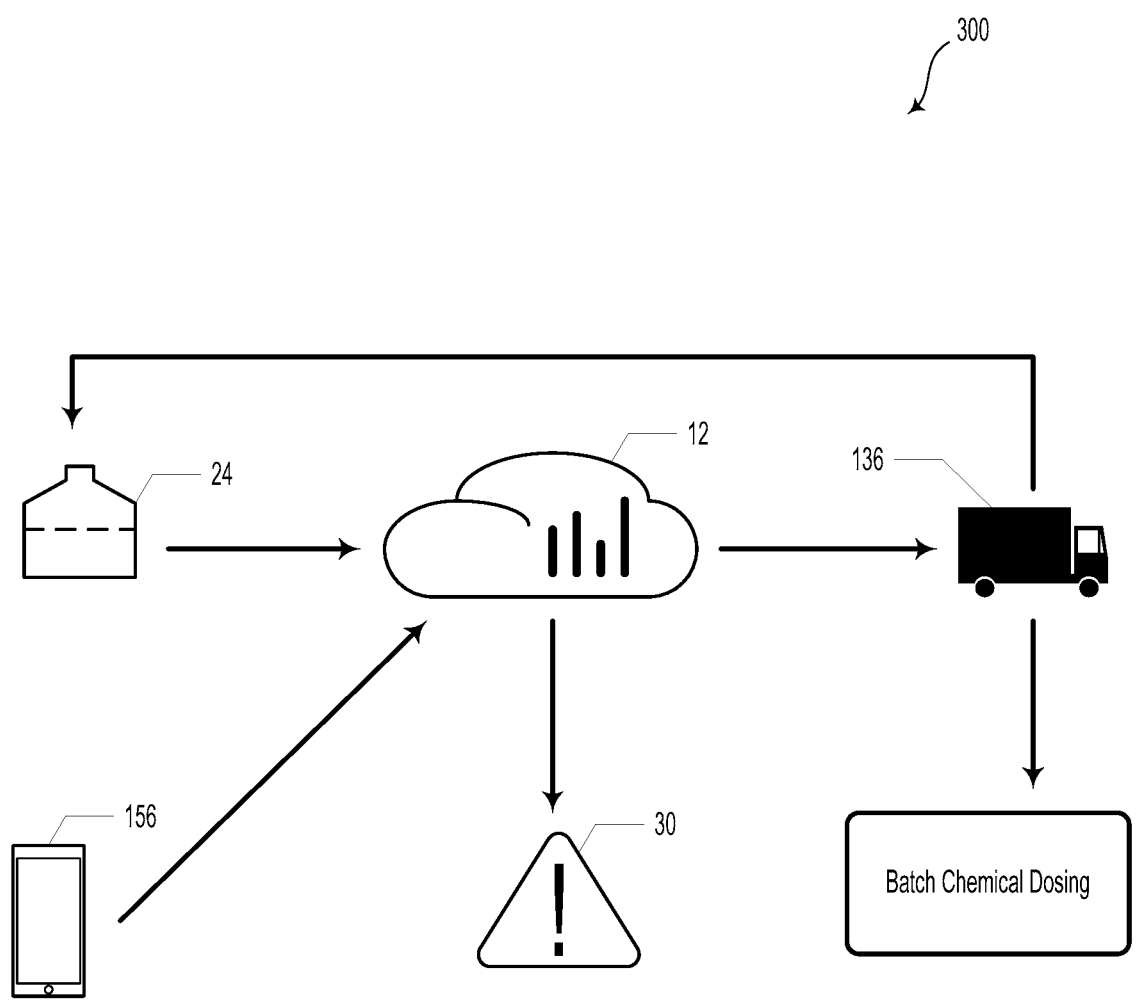
FIG. 3 illustrates a method, according to an example embodiment.

FIG. 3 illustrates a method 300, according to an example embodiment. Method 300 may be carried out, in full or in part, by some or all elements of systems 10, 100, and 170 as illustrated and described in reference to FIGS. 1A, 1B, and 1C. As such, method 300 may include elements that are similar or identical to those illustrated and described with reference to FIGS. 1A, 1B, and 1C. It will be understood that the method 300 may include fewer or more steps or blocks than those expressly disclosed herein. Furthermore, respective steps or blocks of method 300 may be performed in any order and each step or block may be performed one or more times. In some embodiments, method 300 may be combined with one or more other methods illustrated and described herein.

Method 300 includes receiving, from at least one sensor (e.g., a tank level sensor) via a communication interface (e.g., communication interface 140), information indicative of a current amount of a chemical or a chemical composition in a chemical storage tank (e.g., on-site chemical tank 24). Method 300 also includes determining, based on the received information, a refill condition. In an example embodiment, the refill condition includes a desired dosage/amount of the chemical.

Method 300 additionally includes, in response to determining the refill condition, causing a chemical delivery system (e.g., chemical delivery system 130) to deliver the desired dosage/amount of the chemical (e.g., chemical 132) to the chemical storage tank. Additionally or alternatively, the chemical delivery system 130 may provide a batch chemical dose, which may include filling multiple tanks with one or more chemicals, which may be associated with multiple production sites.

In some embodiments, method 300 may optionally include determining (e.g., at notification system 30), based on the received information, an alarm condition. In such a scenario, in response to determining the alarm condition, the method 300 includes transmitting an alert notification via the communication interface.

Furthermore, method 300 may optionally include determining the refill condition based on information received from a mobile computing device (e.g., mobile computing device 156). For example, a user may input a refill request from the mobile computing device.

Figure 4:
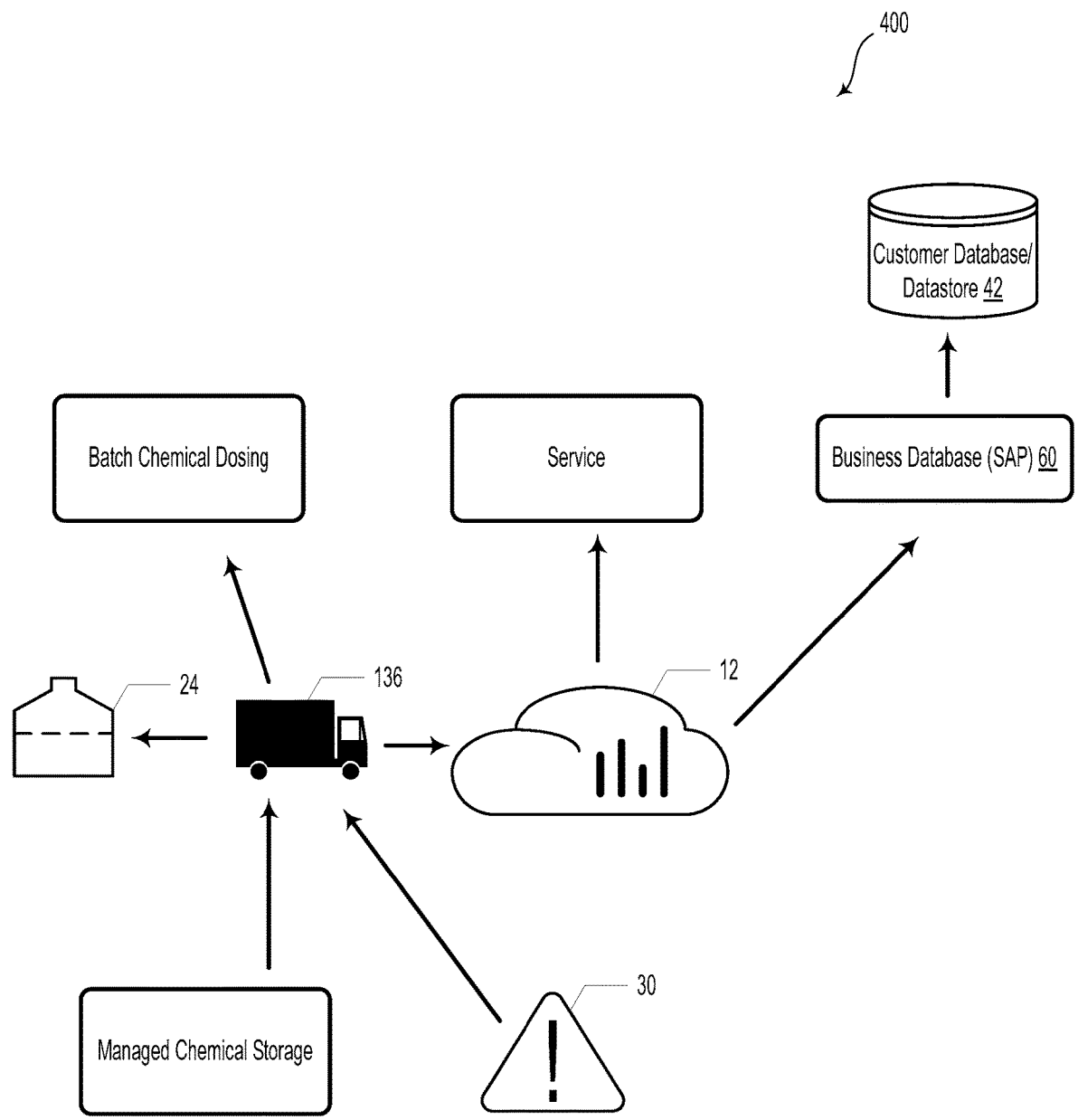
FIG. 4 illustrates a method, according to an example embodiment.

FIG. 4 illustrates a method 400, according to an example embodiment. Method 400 may be carried out, in full or in part, by some or all elements of systems 10, 100, and 170 as illustrated and described in reference to FIGS. 1A, 1B, and 1C. As such, method 400 may include elements that are similar or identical to those illustrated and described with reference to FIGS. 1A, 1B, and 1C. It will be understood that the method 400 may include fewer or more steps or blocks than those expressly disclosed herein. Furthermore, respective steps or blocks of method 400 may be performed in any order and each step or block may be performed one or more times. In some embodiments, method 400 may be combined with one or more other methods illustrated and described herein.

Method 400 includes receiving, from at least one sensor at a production site (e.g., production site 20 or a managed chemical storage facility located proximate to the production site), information indicative of a desired dosage/amount of a chemical (e.g., chemical 132). Method 400 also includes, based on the received information, causing a chemical delivery system (e.g., chemical delivery system 130) to deliver the desired dosage/amount of the chemical to an on-site chemical tank (on-site chemical tank 24) at the production site.

In some embodiments, method 400 also includes, in response to causing the chemical delivery system to deliver the desired dosage/amount of the chemical, providing a refill report to a cloud computing system (e.g., cloud computing system 12). Additionally or alternatively, the method 400 may include, in response to providing the refill report to a cloud computing system, determining a service request based on the refill report. The service request could include a site visit request by service personnel for equipment repair, maintenance, a status check, or monitoring.

In some cases, method 400 includes, in response to providing the refill report to a cloud computing system, updating at least one database (e.g., business database 60 and/or customer database/datastore 42) based on the refill report.

Figure 5:
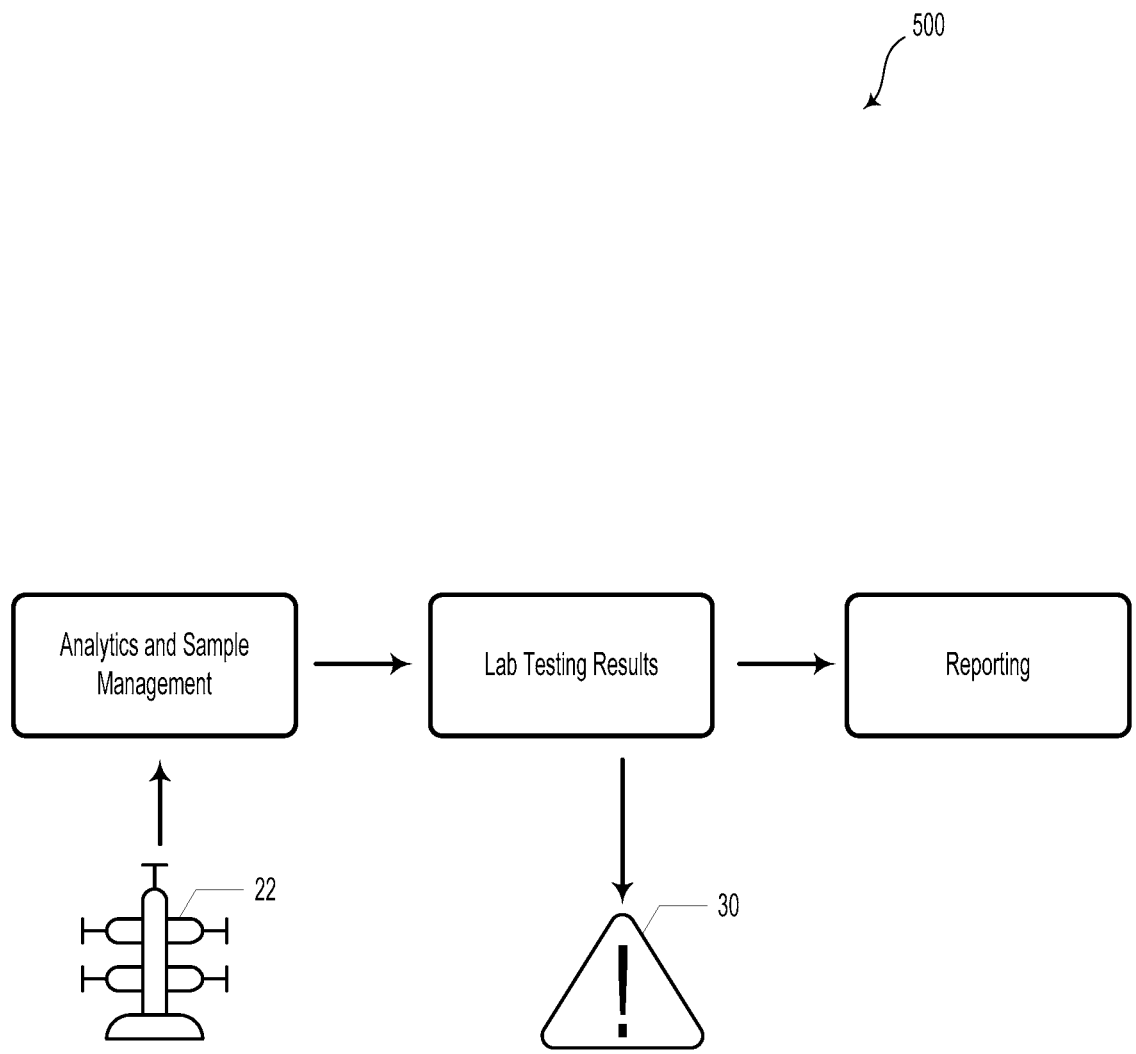
FIG. 5 illustrates a method, according to an example embodiment.

FIG. 5 illustrates a method 500, according to an example embodiment. Method 500 may be carried out, in full or in part, by some or all elements of systems 10, 100, and 170 as illustrated and described in reference to FIGS. 1A, 1B, and 1C. As such, method 500 may include elements that are similar or identical to those illustrated and described with reference to FIGS. 1A, 1B, and 1C. It will be understood that the method 500 may include fewer or more steps or blocks than those expressly disclosed herein. Furthermore, respective steps or blocks of method 500 may be performed in any order and each step or block may be performed one or more times. In some embodiments, method 500 may be combined with one or more other methods illustrated and described herein.

Method 500 includes obtaining a test sample from a production site (e.g., production site 20) and associating the test sample with a unique test sample identifier. The unique test sample identifier could include, without limitation, a universal product code (UPC), a radio frequency identification (RFID) tag, a SKU, a bar code, a QR code, or another type of identifier.

In example embodiments, the test sample could include a solid, liquid, and/or gaseous material that may provide information regarding a process parameter of the production site. For example, the test sample could be a sample of oil from an oil well. Additionally or alternatively, the test sample could include a byproduct from the production site.

Method 500 includes analyzing the test sample and determining, based on analyzing the test sample, at least one process parameter value.

Method 500 additionally includes, based on the determined at least one process parameter value, carrying out at least one of: generating a test report based at least on: the unique test sample identifier and the determined at least one process parameter value, generating a notification based at least on: the determined at least one process parameter value and a location of the production site, or updating at least one database based at least on: the unique test sample identifier and the determined at least one process parameter value.

In some embodiments, method 500 may optionally include determining a desired dosage/amount of a chemical (e.g., chemical 132) based on the determined at least one process parameter value. In such scenarios, method 500 also may include causing a chemical delivery system (e.g., chemical delivery system 130) to deliver the desired dosage/amount of the chemical to an on-site chemical tank (e.g., on-site chemical tank 24) at the production site.

In some embodiments, method 500 may include providing a notification (e.g., from notification system 30) based on the at least one process parameter value. Additionally or alternatively, method 500 may include providing at least one report to at least one database (e.g., business database 60 and/or customer database/datastore 42) based on the at least one process parameter value.

Figure 6:
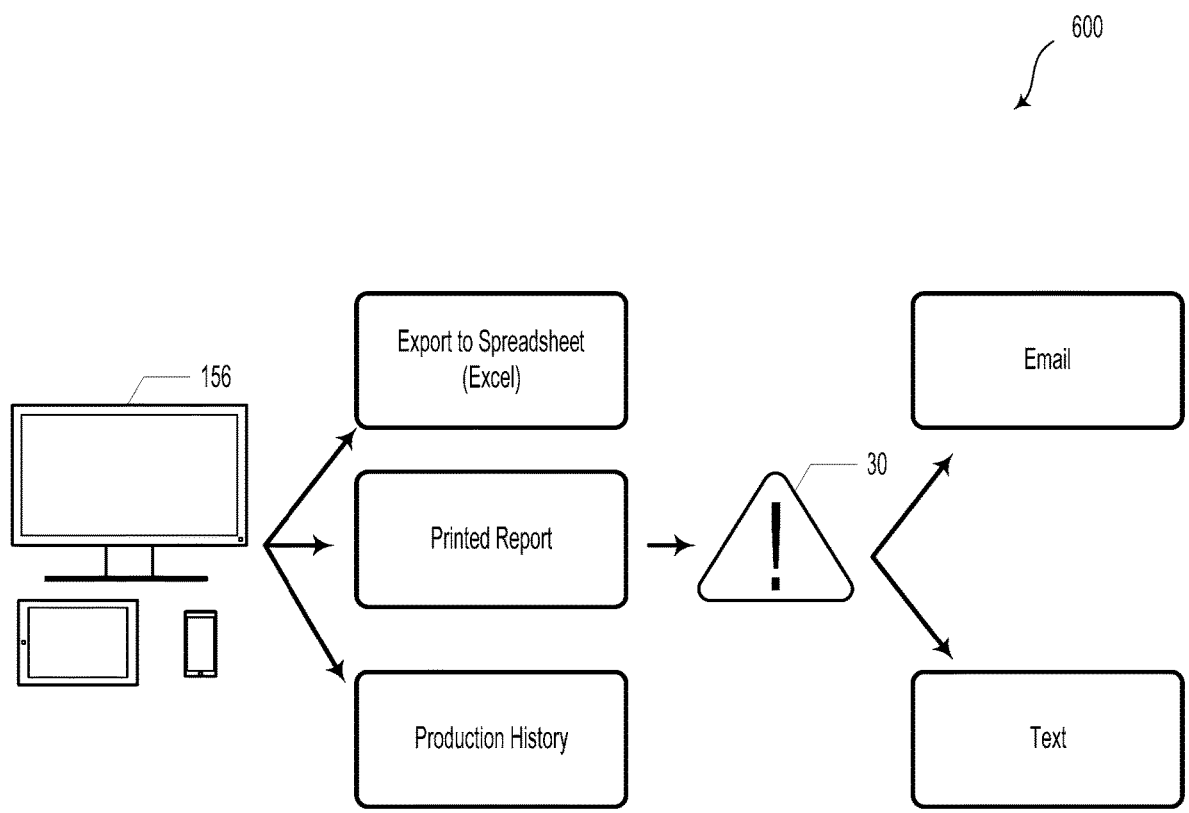
FIG. 6 illustrates a method, according to an example embodiment.

FIG. 6 illustrates a method 600, according to an example embodiment. Method 600 may be carried out, in full or in part, by some or all elements of systems 10, 100, and 170 as illustrated and described in reference to FIGS. 1A, 1B, and 1C. As such, method 600 may include elements that are similar or identical to those illustrated and described with reference to FIGS. 1A, 1B, and 1C. It will be understood that the method 600 may include fewer or more steps or blocks than those expressly disclosed herein. Furthermore, respective steps or blocks of method 600 may be performed in any order and each step or block may be performed one or more times. In some embodiments, method 600 may be combined with one or more other methods illustrated and described herein.

Method 600 includes receiving, from a production sensor (e.g., production sensor 174) at a production site (e.g., production site 20), information indicative of at least one process parameter value associated with the production site. Furthermore, method 600 includes, based on the received information, providing, via a display of a mobile computing device (e.g., mobile computing device 156), at least one of: a spreadsheet, a report, or historical production data.

Method 600 also includes, based on the received information, providing a notification (e.g., via notification system 30). In such scenarios, the notification may include, but need not be limited to, at least one of: an audio alert, a voicemail, an email, or a text message.

IV. Example User Interfaces

FIGS. 7-15 illustrate several different information interface screens that could be implemented in one or more user interfaces. Such user interfaces could be used in association with the systems and methods described herein. Each of the described user interfaces could illustrate a webpage, website, portal, and/or display screen that could be accessed by a user within the context of one or more higher-level interfaces and/or applications. Additionally or alternatively, the described user interfaces could be provided as "stand-alone" screens. In examples, the described user interfaces could be displayed via a computer screen, a smartphone display, and/or a tablet display. Other types of graphical displays are contemplated herein. In some embodiments, a user could interact with the user interfaces using various input devices and means, such as a touchscreen, touch pad, mouse, keyboard, gesture, gaze detection, and/or one or more buttons, among other possibilities.

In some examples, the described user interfaces could be accessible by chemical suppliers and/or distributors. Additionally or alternatively, the described user interfaces could be accessible by clients of chemical suppliers and/or distributors.

Figure 7:
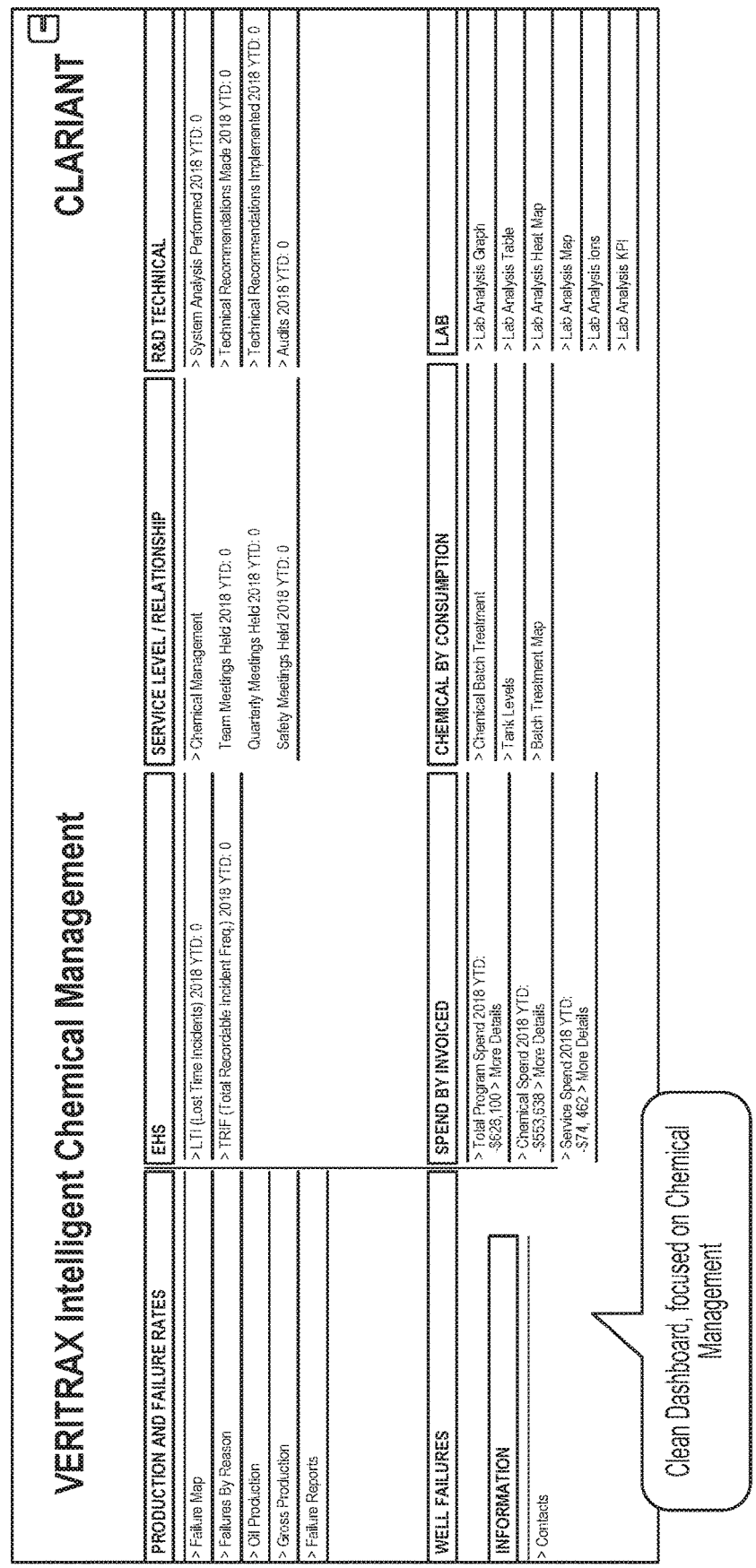
FIG. 7 illustrates a user interface, according to an example embodiment.

FIG. 7 illustrates a user interface 700, according to an example embodiment. The user interface 700 could be a chemical management dashboard. The dashboard could include various menu options such as, but not limited to, production and failure rates, environmental, health, and safety (EHS), service level/relationship, research and development technical analysis and recommendations, well failure, chemical spend, chemical consumption, lab information, etc.

Figure 8:
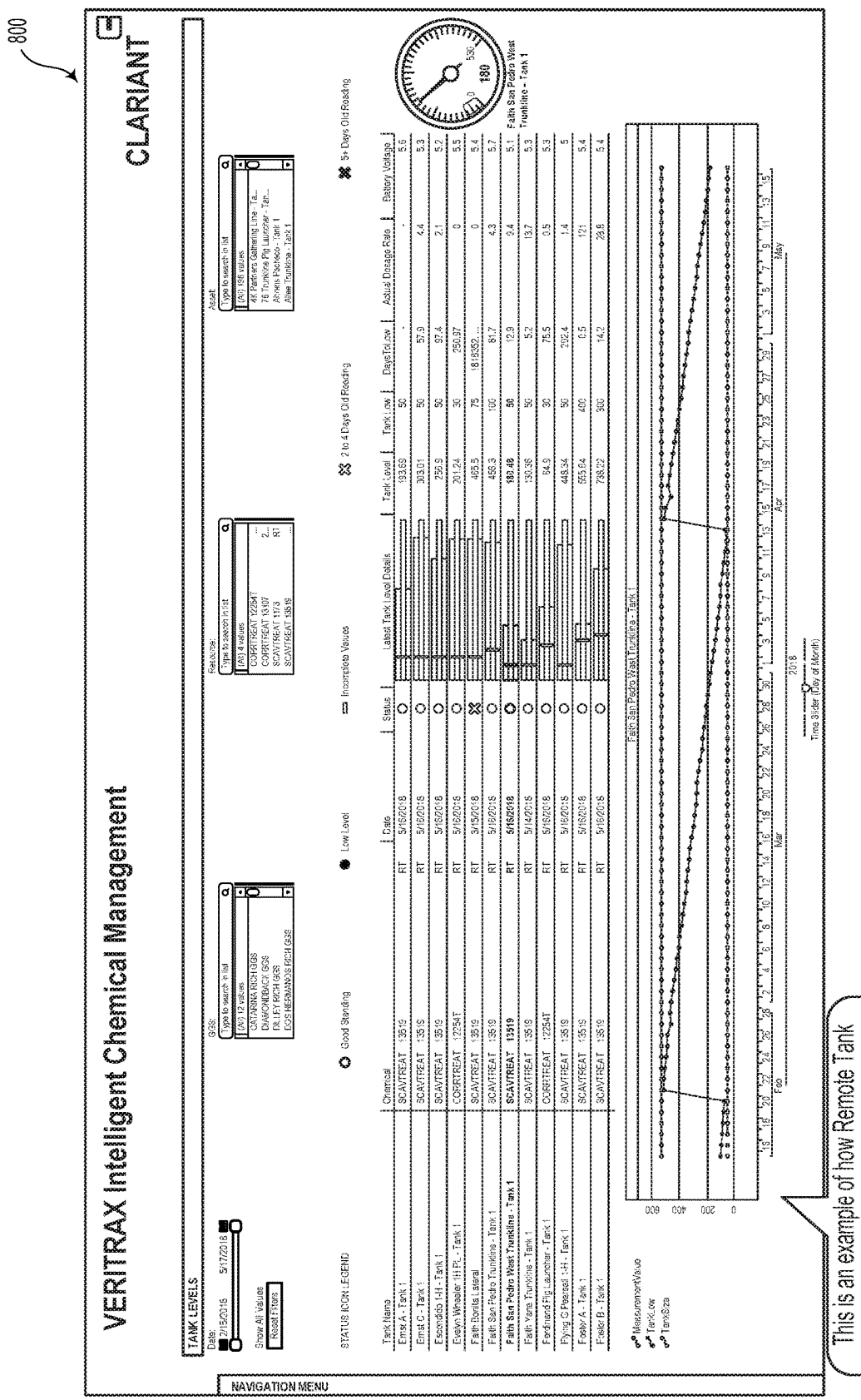
FIG. 8 illustrates a user interface, according to an example embodiment.

FIG. 8 illustrates a user interface 800, according to an example embodiment. The user interface 800 could provide remote monitoring information regarding chemical storage tank levels. As an example, the user interface 800 could provide numerical and/or graphical information relating to respective volumes of one or more chemicals stored and/or in use at a plurality of production sites.

Figure 9:
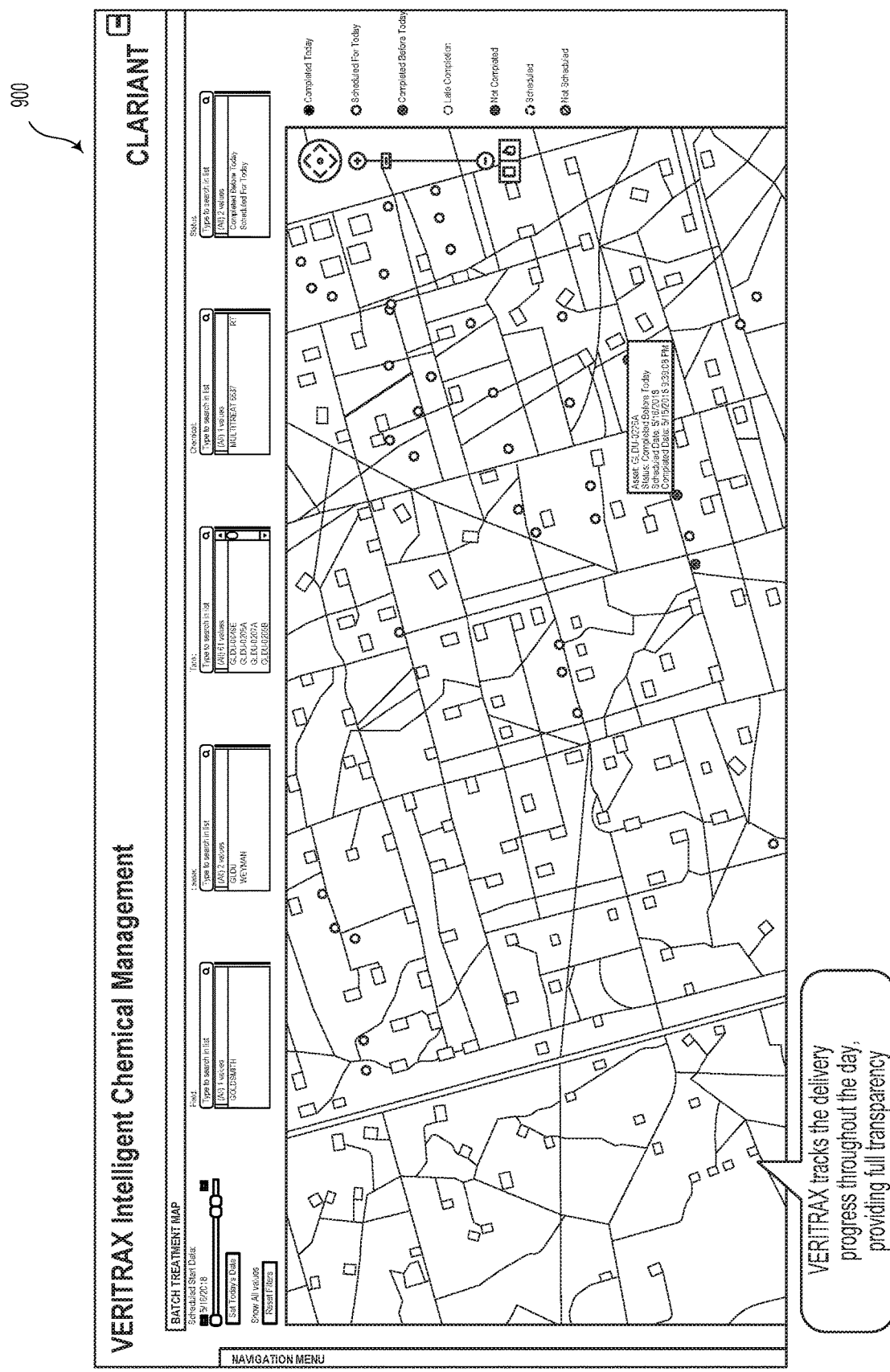
FIG. 9 illustrates a user interface, according to an example embodiment.

FIG. 9 illustrates a user interface 900, according to an example embodiment. The user interface 900 could provide map-based information about chemical delivery progress and/or chemical levels. For example, the user interface 900 could indicate production sites to be visited and/or previously visited by a chemical delivery vehicle and/or display a chemical delivery route. The map-based information could be selected by production site, lessee, chemical storage tank, chemical type, and/or delivery status.

Figure 10:
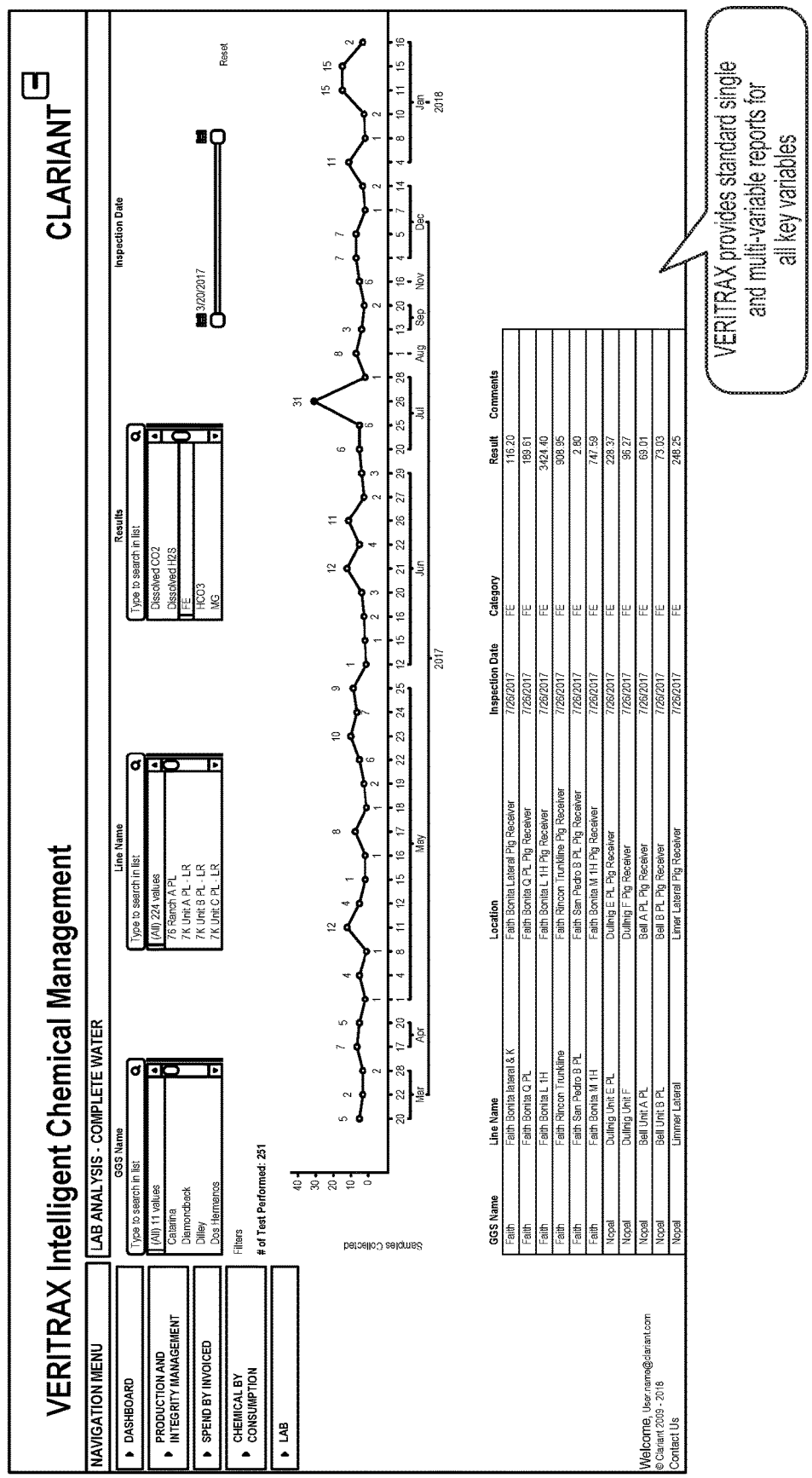
FIG. 10 illustrates a user interface, according to an example embodiment.

FIG. 10 illustrates a user interface 1000, according to an example embodiment. The user interface 1000 could include lab analysis information. The lab analysis information could be selected based on, for example, production site location, production site identifier, lab analysis type, inspection/sample collection date, among other possibilities. In some embodiments, user interface 1000 could include graphical and/or numerical information about historical sample collection. Furthermore, user interface 1000 could provide single and/or multi-variable reports based on user-selected menu options.

Figure 11:
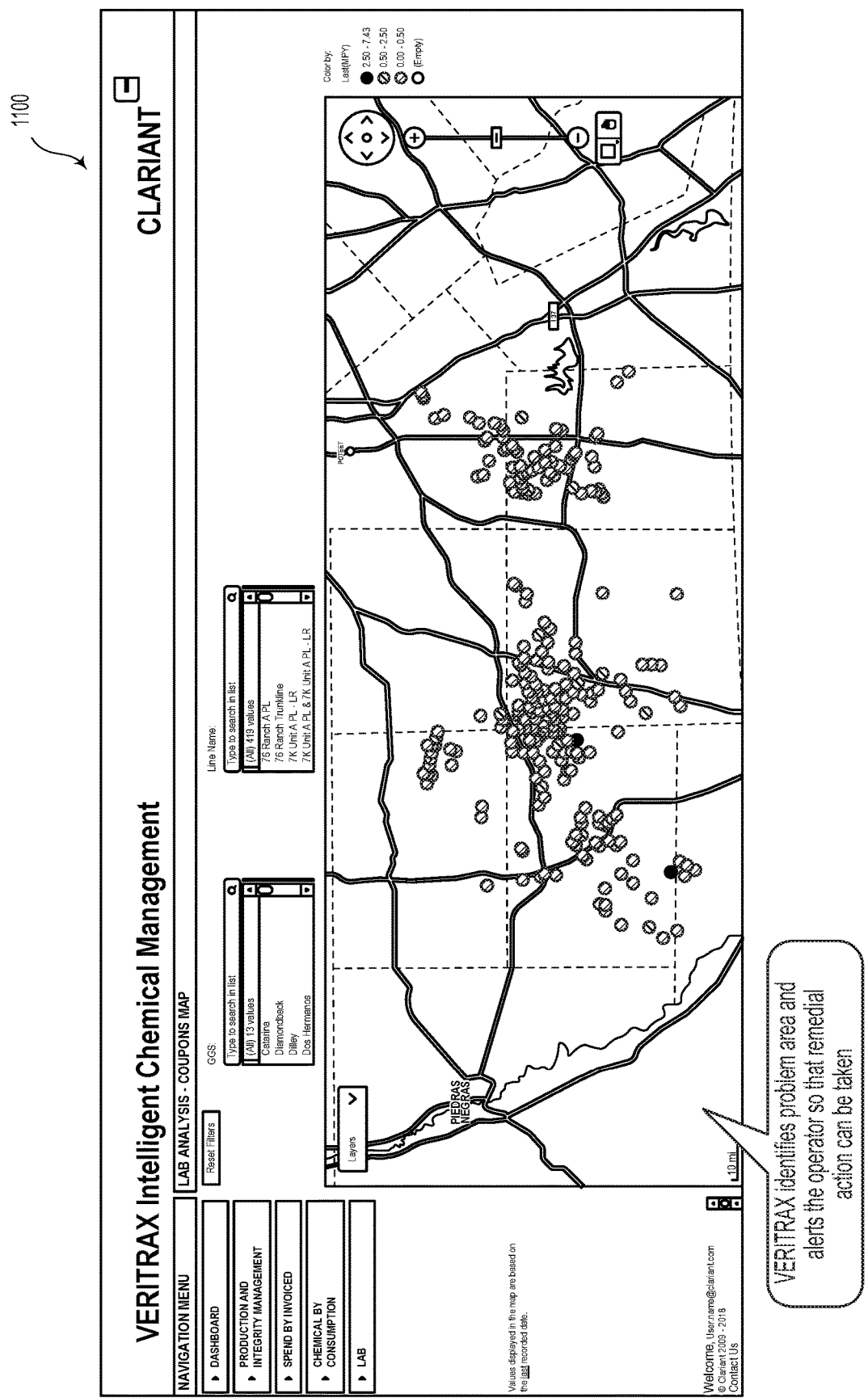
FIG. 11 illustrates a user interface, according to an example embodiment.

FIG. 11 illustrates a user interface 1100, according to an example embodiment. User interface 1100 could include map-based information relating to corrosion rates as measured by a corrosion coupon at various production sites. In some example embodiments, production sites that indicate a high corrosion rate (e.g., 2.5-7.43 mils per year (mpy)) could be marked with a different symbol and/or different color than other production sites. Accordingly, a chemical supplier, chemical distributor and/or owner/lessee can more easily take remedial measures (e.g., deliver and/or apply an anti-corrosion chemical) where needed.

Figure 12:
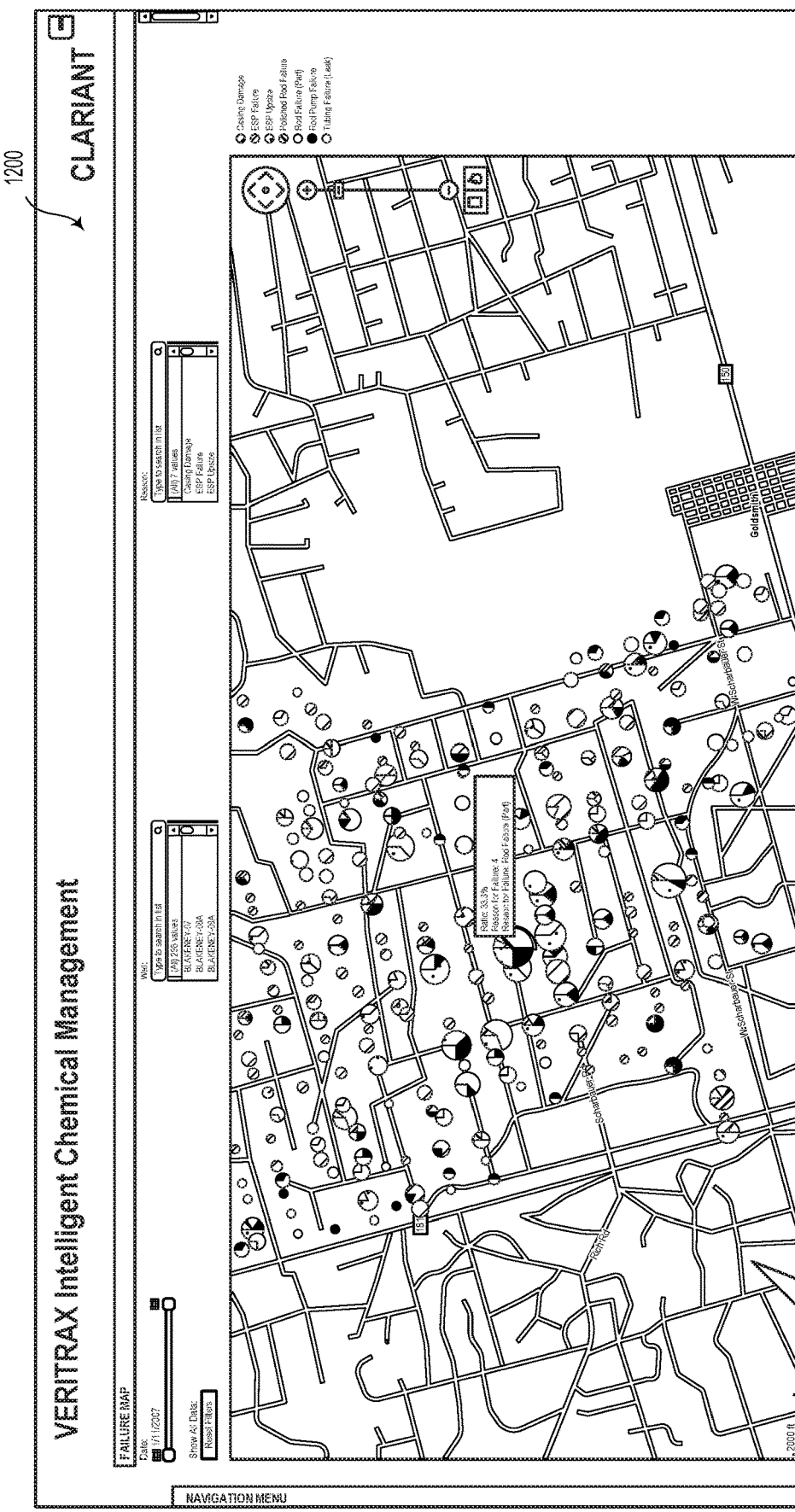
FIG. 12 illustrates a user interface, according to an example embodiment.

FIG. 12 illustrates a user interface 1200, according to an example embodiment. The user interface 1200 includes map-based information relating to various failure mechanisms that may impact operations at a given production site. For example, graphical information could be provided (e.g., a pie chart) for each production site within a given map region. The pie chart could indicate how often a production site experiences various types of failures. In some embodiments, the diameter of the pie chart for a given production site could be based on an overall amount of downtime (e.g., sites with more days of downtime could be represented with larger pie charts).

Figure 13:
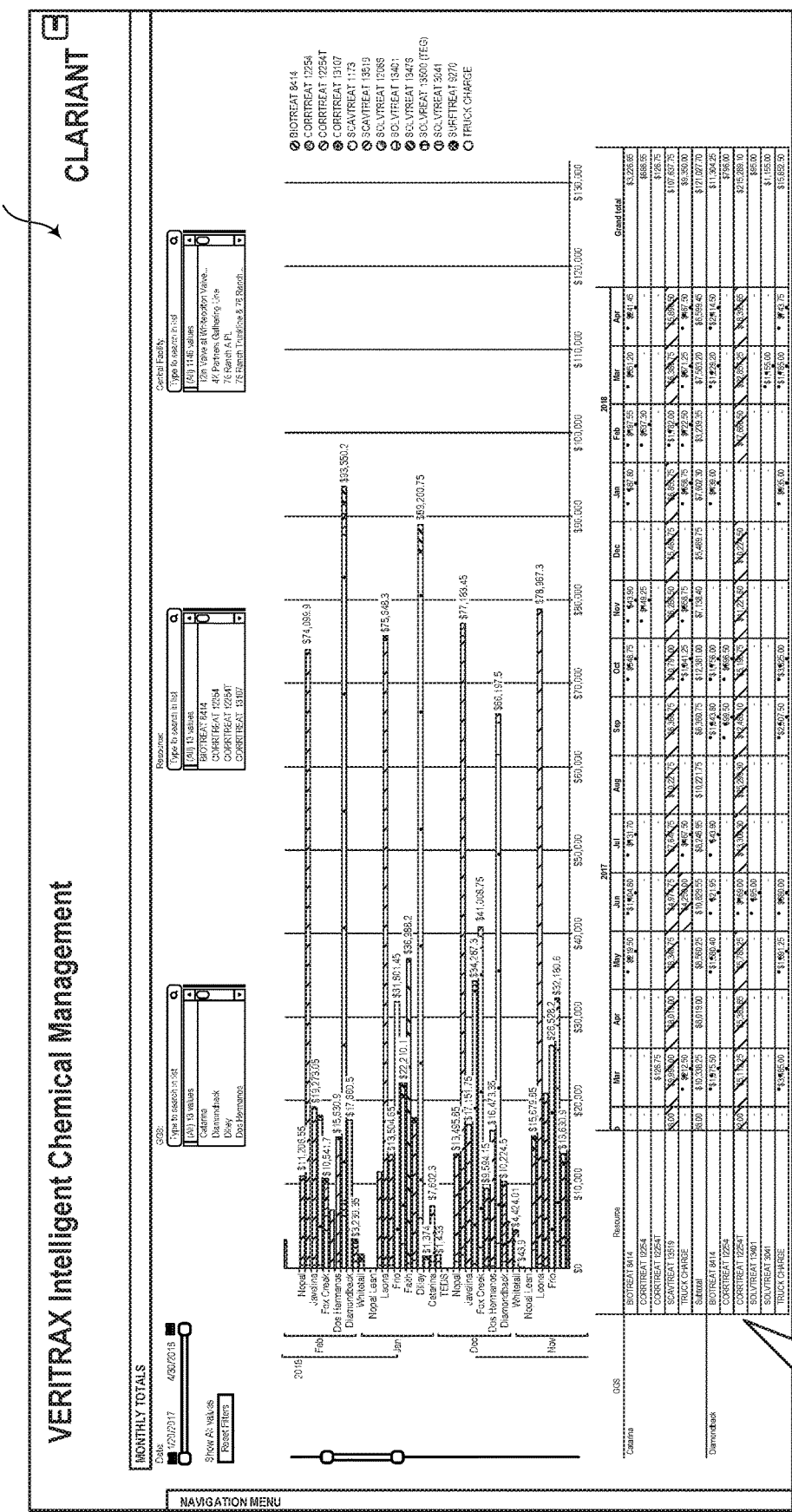
FIG. 13 illustrates a user interface, according to an example embodiment.

FIG. 13 illustrates a user interface 1300, according to an example embodiment. User interface 1300 includes financial information relating to spending rates or spending levels for one or more supplied chemicals at a given production site during a given period of time (e.g., quarterly or monthly). The financial information could be provided in graphical and/or numerical formats. In some embodiments, the financial information could be organized by chemical (e.g., monthly spend for a given chemical over a plurality of production sites).

Figure 14:
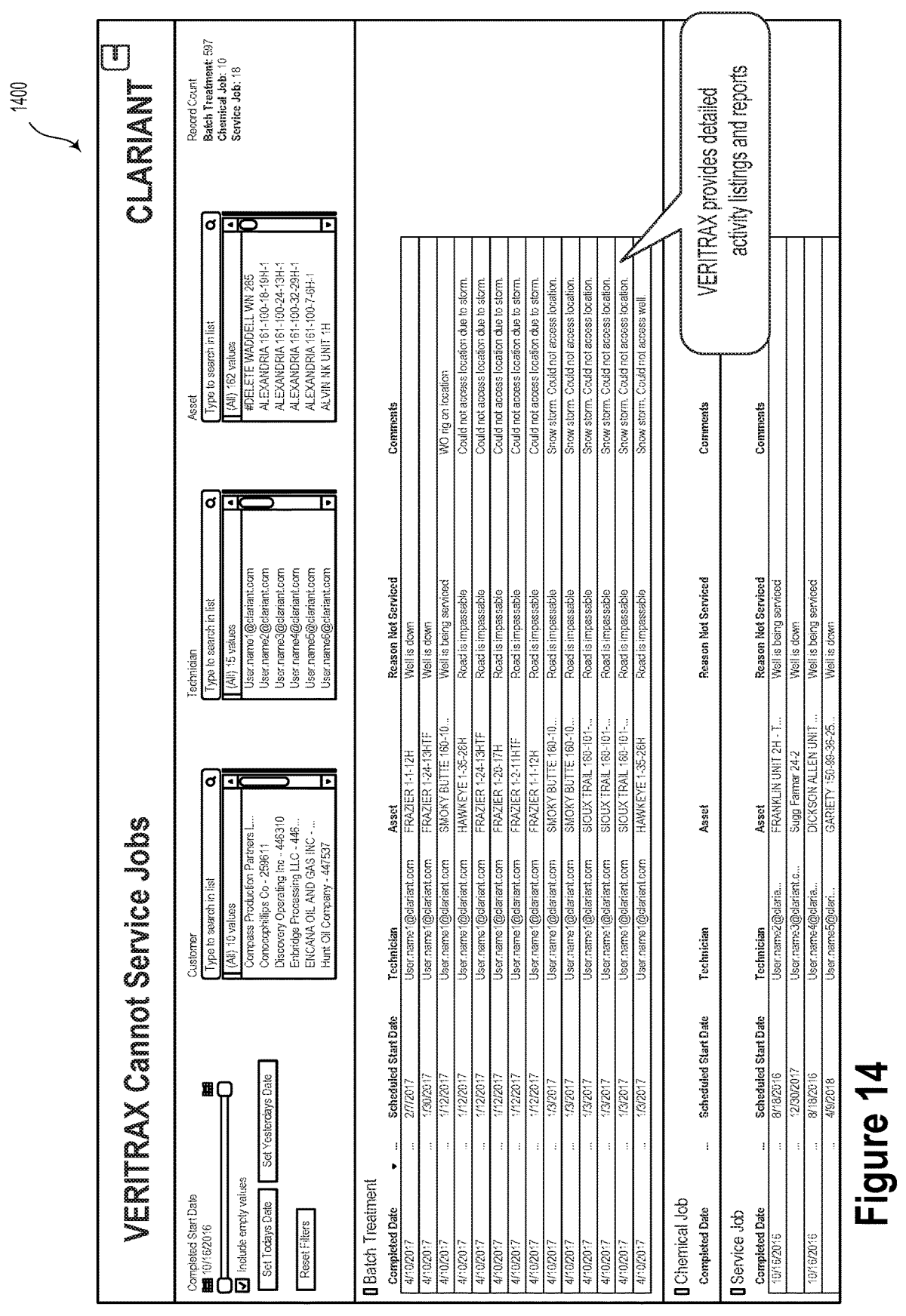

FIG. 14 illustrates a user interface 1400, according to an example embodiment. User interface 1400 could include information about service requests that cannot be completed and why. For example, the information provided by user interface 1400 could include a scheduled job (e.g., chemical delivery, maintenance service request, etc.) and a reason why the scheduled job was not completed (e.g., inaccessible due to weather, inactive well, well was being separately serviced for other reasons, etc.).

Figure 15:
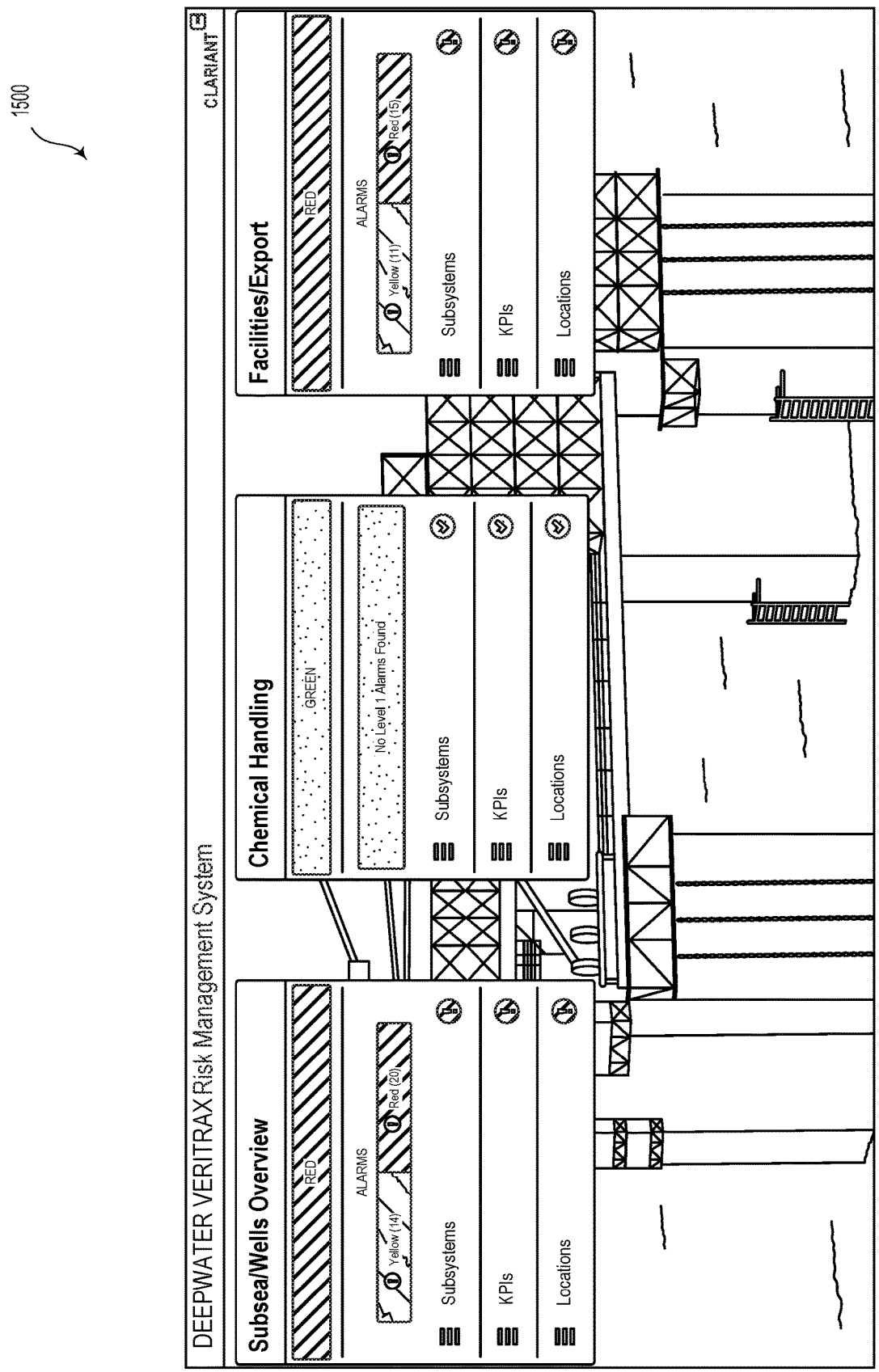
FIG. 15 illustrates a user interface, according to an example embodiment.

FIG. 15 illustrates a user interface 1500, according to an example embodiment. The user interface 1500 could include, for instance, risk management information. Such risk management information could include, but is not limited to, a subsea well alarm dashboard, chemical handling alarm dashboard, and/or a facilities alarm dashboard. In example embodiments, the respective alarm dashboards could provide information about subsystems, key performance indicators (KPI), and/or production site locations. The alarm information could be provided in various colors to distinguish between warnings (yellow) and alerts (red). Other ways to present such alarm information are contemplated and possible with the context of the present disclosure.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system, comprising:
a positioning system;
a chemical delivery site, the chemical delivery site comprising an oil or gas production site and an on-site chemical delivery tank;
a mobile delivery vehicle comprising a chemical delivery system configured to dispense at least one oil or gas production chemical, the chemical delivery system comprising a meter;
a production sensor configured to obtain information about a process parameter associated with oil or gas production at the oil or gas production site;
a communication interface; and
a controller comprising at least one processor and a memory, wherein the at least one processor executes program instructions stored in the memory so as to carry out operations, the operations comprising:
receiving, from the production sensor, the process parameter associated with oil or gas production at the oil or gas production site;
receiving information indicative of a current level of the on-site chemical delivery tank,
receiving, from the positioning system, information indicative of the chemical delivery site;
determining a chemical delivery request, based on the received process parameter and information indicative of the current level of the on-site chemical delivery tank;
routing the mobile delivery vehicle to the chemical delivery site, based on the chemical delivery request;
causing the chemical delivery system of the chemical delivery vehicle to dispense, based on the chemical delivery request, an at least one oil or gas production chemical into the on-site chemical delivery tank of the chemical delivery site;

receiving, from the meter, information indicative of a dispensed amount of the at least one oil or gas production chemical; and transmitting, to a server via the communication interface, information indicative of the chemical delivery site, the identity of the at least one oil or gas production chemical, and the dispensed amount of the at least one oil or gas production chemical.

2. The system of claim 1, wherein the oil or gas production site is: an oil well, a natural gas well, an oil stripper well, or a natural gas stripper well.

3. The system of claim 1, wherein the mobile delivery vehicle is at least one of: a tanker truck, a delivery truck, an aerial delivery vehicle, or a water-borne delivery vehicle.

4. The system of claim 1, further comprising a mobile computing device, wherein at least a portion of the controller is coupled to the mobile computing device.

5. The system of claim 4, wherein the mobile computing device comprises at least one of: a tablet computer, a smartphone, and a laptop computer.

6. The system of claim 1, wherein the meter is operable to monitor and adjust the dispensed amount of the at least one oil or gas production chemical to within ±0.1 gallons or smaller volume increments.

7. A method comprising:

receiving from a positioning system information indicative of a chemical delivery site;

receiving, from a production sensor associated with an oil or gas production site of a chemical delivery site, a process parameter associated with oil or gas production at the oil or gas production site;

receiving information indicative of a current level of an on-site chemical tank of the chemical delivery site;

determining a chemical delivery request, based on the received process parameter and information indicative of the current level of the on-site chemical tank;

routing a mobile delivery vehicle to the chemical delivery site, based on the chemical delivery request;

causing, based on the chemical delivery request, a chemical delivery system of the mobile delivery vehicle to dispense at least one oil and gas production chemical to the on-site chemical tank of the chemical delivery site;

receiving, from a meter of the chemical delivery system, information indicative of a dispensed amount of the at least one oil and gas production chemical; and transmitting, to a server via a communications interface, information indicative of the chemical delivery site, the identity of the at least one oil or gas production chemical, and the dispensed amount of the at least one oil or gas production chemical.

8. The method of claim 7, wherein the process parameter is one or more of well head pressure, a temperature of a production component, a flow rate of oil or gas, a chemical composition of a well, information indicative of an oil well operating within a normal range, and well output conditions.

9. The method of claim 7, wherein the server maintains historical records of process parameter values analyzes historical trends of a process parameter.

10. The method of claim 7, further comprising determining, based on the information indicative of the chemical delivery site, an identity of the at least one chemical, and a dispensed amount of the at least one chemical, dispensed as a result from the chemical delivery request.

* * * * *